(12) United States Patent
Kawakami

(10) Patent No.: US 7,194,928 B2
(45) Date of Patent: Mar. 27, 2007

(54) BICYCLE SHIFT OPERATING DEVICE

(75) Inventor: Tatsuya Kawakami, Sakai (JP)

(73) Assignee: Shimano Inc., Osaka (JP)

( * ) Notice: Subject to any disclaimer, the term of this patent is extended or adjusted under 35 U.S.C. 154(b) by 401 days.

(21) Appl. No.: 10/448,197

(22) Filed: May 30, 2003

(65) Prior Publication Data

US 2004/0237697 A1    Dec. 2, 2004

(51) Int. Cl.
*G05G 11/00* (2006.01)

(52) U.S. Cl. .................... 74/502.2; 74/473.3

(58) Field of Classification Search ............ 74/473.14, 74/473.15, 473.3, 502.2, 535, 537
See application file for complete search history.

(56) References Cited

U.S. PATENT DOCUMENTS

| | | | |
|---|---|---|---|
| 4,548,092 A * | 10/1985 | Strong, Jr. ............... | 74/473.14 |
| 4,864,885 A | 9/1989 | Nagano | |
| 4,876,913 A * | 10/1989 | Romano ...................... | 74/535 |
| 4,995,280 A * | 2/1991 | Tagawa ..................... | 74/480 R |
| 5,012,692 A | 5/1991 | Nagano | |
| 5,044,213 A | 9/1991 | Nagano | |
| 5,052,241 A | 10/1991 | Nagano | |
| 5,186,072 A | 2/1993 | Nagano | |
| 5,203,213 A | 4/1993 | Nagano | |
| 5,222,412 A | 6/1993 | Nagano | |
| 5,241,878 A | 9/1993 | Nagano | |
| 5,287,766 A | 2/1994 | Nagano | |
| 5,400,675 A | 3/1995 | Nagano | |
| 5,601,001 A * | 2/1997 | Kawakami et al. ........ | 74/502.2 |
| 5,676,022 A | 10/1997 | Ose | |
| 5,730,030 A | 3/1998 | Masui | |
| 5,921,138 A | 7/1999 | Kojima et al. | |
| 6,095,010 A | 8/2000 | Arbeiter et al. | |
| 6,216,078 B1 | 4/2001 | Jinbo et al. | |
| 6,453,764 B1 | 9/2002 | Ose | |
| 6,502,477 B1 | 1/2003 | Assel | |
| 2002/0124679 A1 | 9/2002 | Dal Pra | |

FOREIGN PATENT DOCUMENTS

| EP | 1 232 940 A2 | 8/2002 |
|---|---|---|
| JP | 02-088384 | 3/1990 |

* cited by examiner

*Primary Examiner*—Chong H. Kim
(74) *Attorney, Agent, or Firm*—Global IP Counselors, LLP

(57) ABSTRACT

A bicycle shift operating device is basically provided with a first operating member, a second operating member, a shift wire take-up element and a wire winding/release mechanism. The second operating member is operatively coupled to the first operating member to move with the first operating member during movement of the first operating member, and to move the first operating member during movement of the second operating member. The shift wire take-up element is rotated in a first rotational direction by the first operating member and in a second rotational direction that is opposite to the first rotational direction by the second operating member. The wire winding/release mechanism is operatively coupled to the shift wire take-up element and the first and second operating members to selectively hold the shift wire take-up element in one of a plurality of shift positions.

14 Claims, 15 Drawing Sheets

BICYCLE SHIFT OPERATING DEVICE

BACKGROUND OF THE INVENTION

1. Field of the Invention

This invention generally relates to a bicycle shift operating device. More specifically, the present invention relates to a shift operating device having a pair of operating (shifting) levers that are moved in substantially the same rotational direction.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the bicycle transmission. Specifically, a bicycle transmission typically includes front and rear shifting mechanisms or shift operating devices that operate front and rear derailleurs to move a chain laterally from one sprocket to another sprocket. The sprockets are usually coupled to the front crank and the rear wheel such that a pedaling force from the ride is transferred to the rear wheel via the chain.

In the past, shift operating devices have been often been utilized that include one or more levers that are pivoted to wind an inner wire of a control cable. The wires are operatively coupled to the front and rear derailleurs to laterally shift the derailleurs and thereby move the chain between the various sprockets. These prior shifting devices can require uncomfortable or unnatural movements of the rider's hands to operate. Furthermore, some of these prior shifting devices are sometimes cumbersome to operate because the levers are pivoted in opposite directions or require a significantly different shifting motion to operate each of the levers. Moreover, some of these prior shifting devices can be complicated and expensive to manufacture and assemble.

In view of the above, it will be apparent to those skilled in the art from this disclosure that there exists a need for an improved bicycle shift operating device that—overcomes these problems. This invention addresses this need in the art as well as other needs, which will become apparent to those skilled in the art from this disclosure.

SUMMARY OF THE INVENTION

One object of the present invention is to provide a bicycle shift operating device with a pair of operating (shifting) levers that are easily to operate.

Another object of the present invention is to provide a bicycle shift operating device having a pair of operating (shifting) levers that move in substantially the same rotational direction.

Another object of the present invention is to provide a bicycle shift operating device that is relatively simple and inexpensive to manufacture and assemble.

Still another object of the present invention is to provide a bicycle shift operating device that provides reliable shifts of the front and rear derailleurs.

The foregoing objects can basically be attained by providing a bicycle shift operating device comprising a first operating member, a second operating member, a shift wire take-up element and a wire winding/release mechanism. The first operating member is arranged to move between a first rest position and a first wire operating position. The second operating member is arranged to move between a second rest position and a second wire operating position. The second operating member is operatively coupled to the first operating member to move with the first operating member during movement of the first operating member from the first rest position to the first wire operating position, and to move the first operating member during movement of the second operating member from the second rest position to the second wire operating position. The shift wire take-up element is arranged to rotate in a first rotational direction upon the movement of the first operating member. The shift wire take-up element is further arranged to rotate in a second rotational direction that is opposite to the first rotational direction upon the movement of the second operating member. The wire winding/release mechanism is operatively coupled to the shift wire take-up element and the first and second operating members to selectively hold the shift wire take-up element in one of a plurality of shift positions.

The foregoing objects can also basically be attained by providing a bicycle shift operating device comprising a first operating member, a second operating member, a shift wire take-up element and a wire winding/release mechanism. The first operating member is arranged to move between a first rest position and a first wire operating position. The second operating member is arranged to move between a second rest position and a second wire operating position. The shift wire take-up element is arranged to rotate in a first rotational direction upon the movement of the first operating member, and arranged to rotate in a second rotational direction that is opposite to the first rotational direction upon the movement of the second operating member. The wire winding/release mechanism is operatively coupled to the shift wire take-up element and the first and second operating members to selectively hold the shift wire take-up element in one of a plurality of shift positions. The wire winding/release mechanism includes a power switching element operatively coupling the shift wire take-up element to the first operating member to wind the shift wire take-up element upon movement of the first operating member from the first rest position to the first wire operating position. The power switching element operatively couples the shift wire take-up element to the second operating member to release the shift wire take-up element upon movement of the second operating member from the second rest position to the second wire operating position.

The foregoing objects can further be attained by providing a bicycle shift operating device comprising a first operating member, a second operating member, a shift wire take-up element and a wire winding/release mechanism. The first operating member is arranged to pivot about a main pivot axis in a first operating direction from a first rest position to a first wire operating position. The second operating member is arranged to at least partially pivot about the main pivot axis and to at least partially pivot about a second pivot axis that is offset from the main pivot during movement of the second operating member from a second rest position to a second wire operating position. The shift wire take-up element is mounted on the main pivot axis to rotate in a first rotational direction upon movement of the first operating member from the first rest position to the first wire operating position and to rotate in a second rotational direction that is opposite to the first rotational direction during the movement of the second operating member from the second rest position to the second wire operating position. The wire winding/release mechanism is operatively coupled to the shift wire take-up element and the first and second operating members to selectively hold the shift wire take-up element in one of a plurality of shift positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
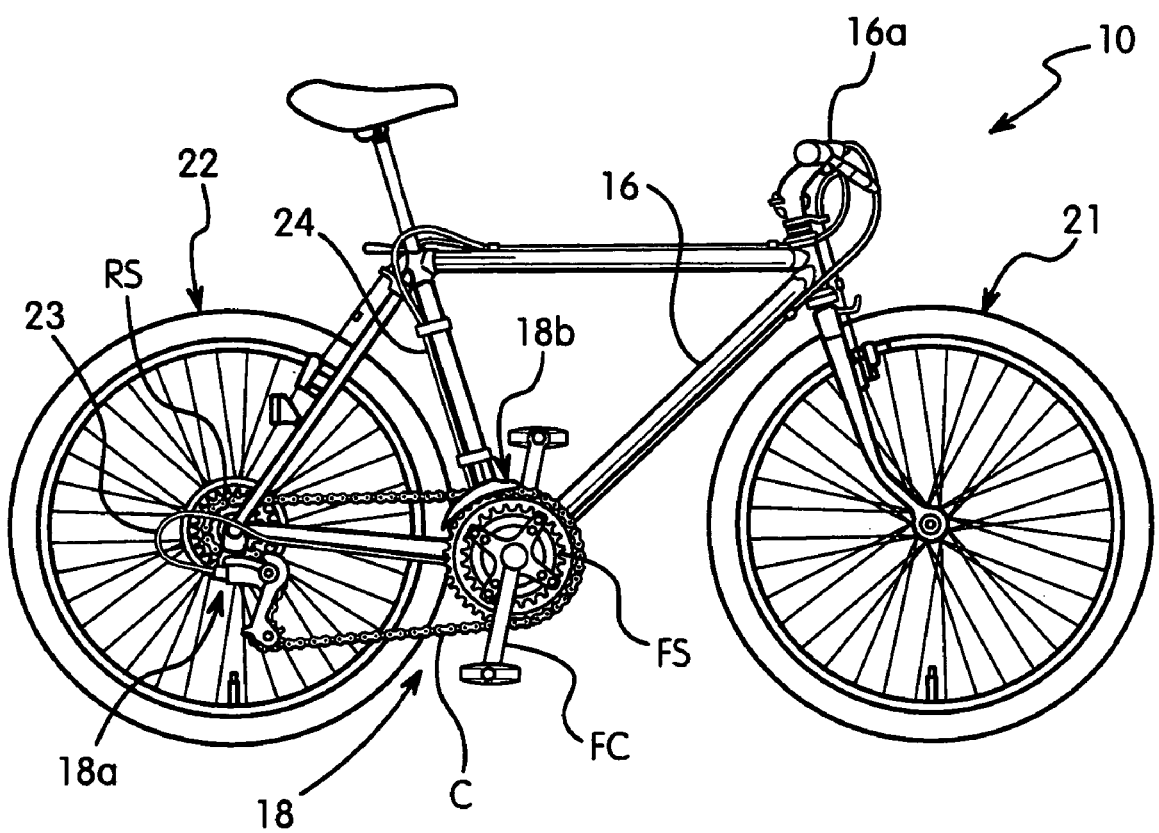
FIG. 1 is a side elevational view of a bicycle with front and rear shift operating devices coupled thereto in accordance with a preferred embodiment of the present invention.
Figure 2:
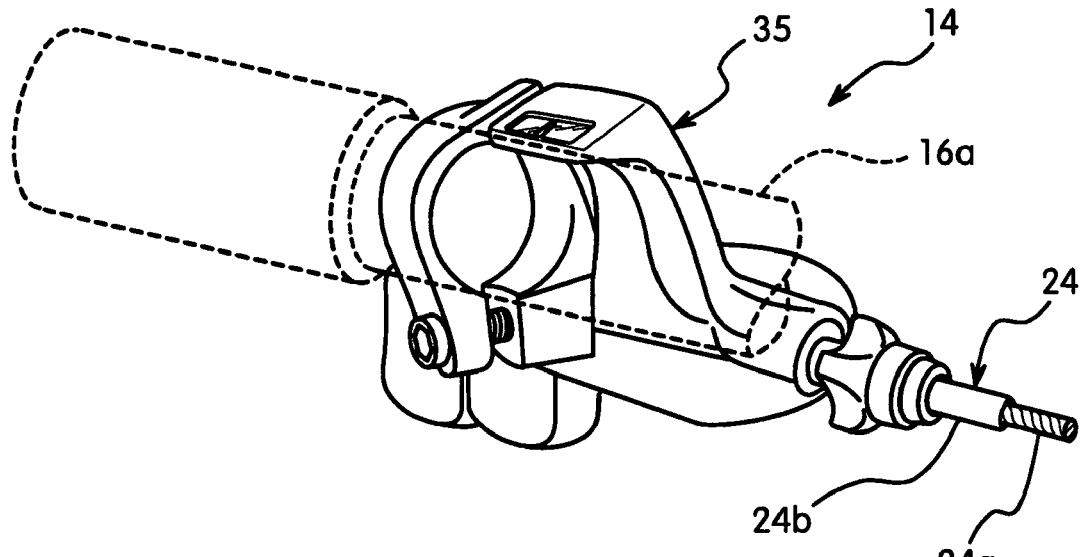
FIG. 2 is an enlarged perspective view of the front shift operating device in accordance with the present invention.
Figure 3:
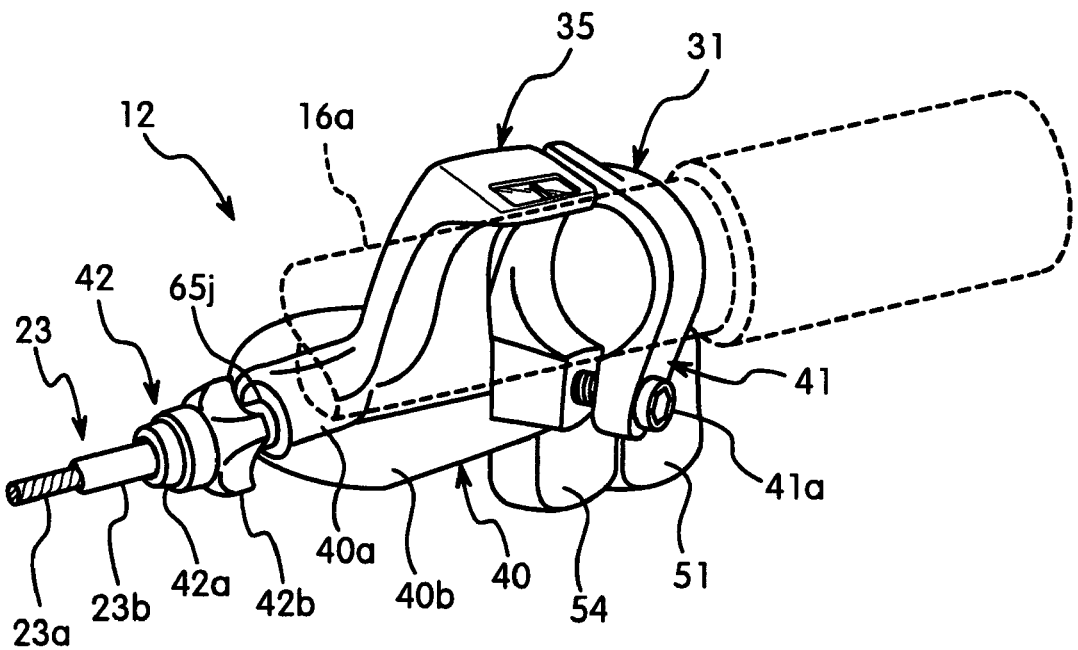
FIG. 3 is an enlarged perspective view of the rear shift operating device in accordance with the present invention.

Referring initially to FIGS. 1–3, a bicycle 10 is illustrated with a rear (first) shift operating device 12 and a front (second) shift operating device 14 is illustrated in accordance with a preferred embodiment of the present invention. As used herein to describe the shift operating devices 12 and 14, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The bicycle 10 basically includes a frame 16, a drive train or transmission 18, a front wheel 21 and a rear wheel 22. The frame 16 includes a handlebar 16a pivotally coupled thereto. Specifically, the handlebar 16a is fixedly coupled to the front fork of the frame 16 to steer the bicycle 10 via the front wheel 21. The drive train or transmission 18 includes a rear derailleur 18a, a front derailleur 18b, a chain C, a plurality of rear sprockets RS coupled to the rear wheel 22 and a front crank FC with a plurality of front sprockets FS coupled thereto. The rear and front derailleurs 18a and 18b are coupled to the frame 16 to move/shift the chain C laterally between the various sprockets RS and FS in a relatively conventional manner. The front sprockets FS are coupled to the front crank FC, while the rear sprockets RS are coupled to the rear wheel 22 via a free wheel to selectively rotate the rear wheel 22 via the chain C in order to propel the bicycle 10 in a conventional manner.

The rear shift operating device 12 is operatively coupled to the rear derailleur 18a via a rear (first) bowden control cable 23 in order to shift the rear derailleur 18a laterally over the rear sprockets RS in a relatively conventional manner. Similarly, the front shift operating device 14 is operatively coupled to the front derailleur 18b via a front (second) bowden control cable 24 to shift the front derailleur 18b laterally over the front sprockets FS in a relatively conventional manner. The rear and front control cables 23 and 24 are identical, except for their lengths, and are basically conventional in construction. In other words, each of the control cables 23 and 24 basically includes an inner wire 23a or 24a slidably received within an outer casing 23b or 24b.

The various parts of the bicycle 10 are conventional, except for the rear and front shift operating devices 12 and 14 as discussed below. Thus, the remaining parts of the bicycle 10 will not be discussed or illustrated in detail herein, except as they relate to the rear and front shift operating devices 12 and 14. Accordingly, it will be apparent to those skilled in the art from this disclosure that various modifications can be made to the various components or parts of the bicycle 10 without departing from the scope of the present invention.

As mentioned above, the rear shift operating device 12 is operatively coupled to the rear derailleur 18a via the rear control cable 23, while the front shift operating device 14 is operatively coupled to the front derailleur 18b via the front control cable 24. In the illustrated embodiment, each of the rear and front shift operating devices 12 and 14 are separate from a brake operating device. However, it will be apparent to those skilled in the art from this disclosure that the shift operating devices 12 and 14 could be designed to be with integrated a brake operating device. The front shift operating device 14 is identical to the rear shift operating device 12, except that the front shift operating device 14 is modified to operate few gear positions, i.e., only three shift positions. In view of the similarly in construction between the shift operating devices 12 and 14, only the rear shift operating device 12 will be discussed and illustrated in detail herein.

Rear Shift Operating Device

Referring now to FIGS. 4–19, the rear shift operating device 12 will now be discussed in more detail. The rear shift operating device 12 is configured, as explained below, to move a chain cage of the rear derailleur 18a laterally, which in turn shifts the chain C of the transmission 18 laterally between the rear sprockets RS. In any event, the rear shift operating device 12 preferably has a number (e.g., eight) of shift positions that corresponds to the number (e.g., eight) of the rear sprockets RS. Of course, it will be apparent to those skilled in the art from this disclosure that the rear derailleur 18a and the rear shift operating device 12 could be designed with a different number (fewer or more) of shift positions as needed and/or desired.

Figure 4:
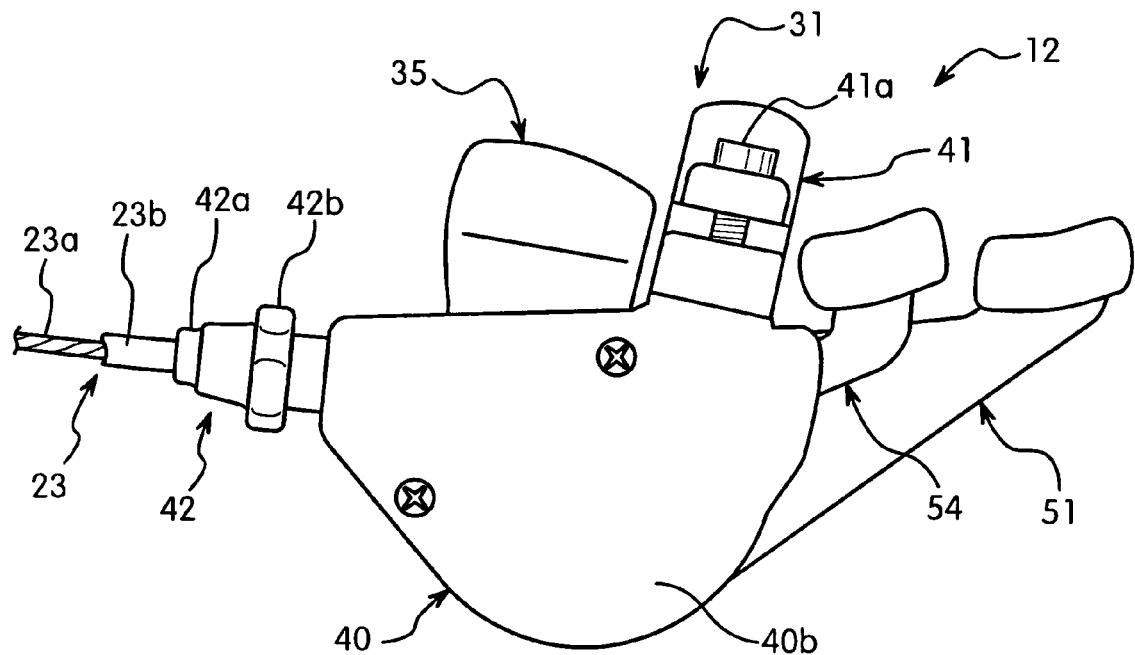
FIG. 4 is a bottom plan view of the rear shift operating device illustrated in FIG. 3.
Figure 5:
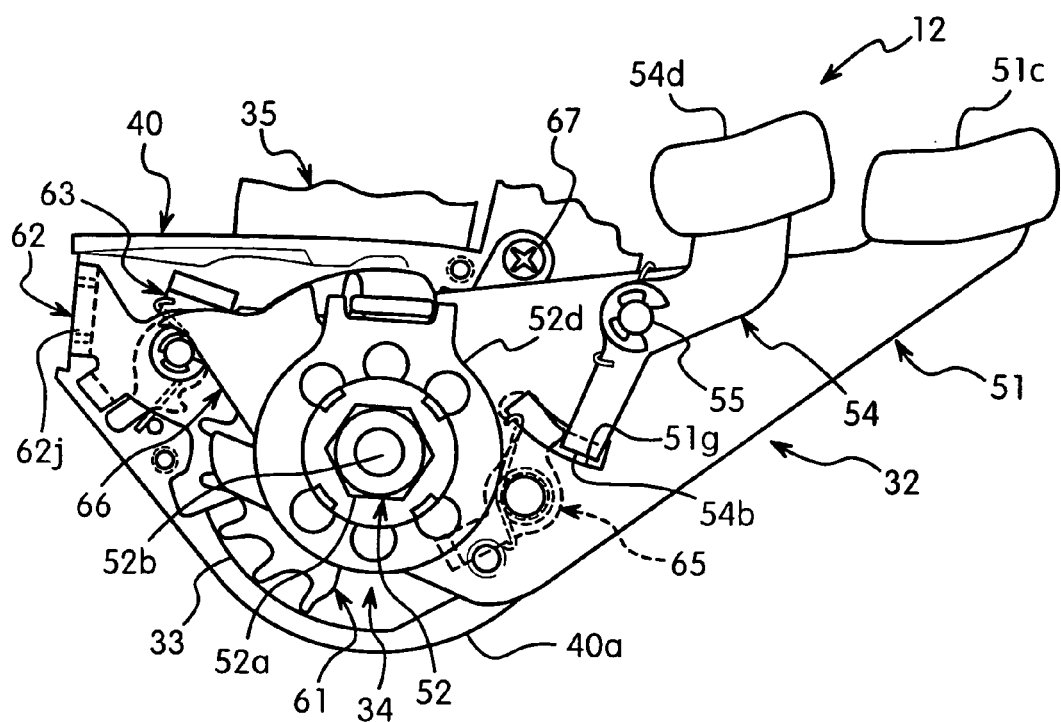
FIG. 5 is a bottom plan view of the rear shift operating device illustrated in FIGS. 3 and 4 with the bottom cover removed to show the rear shift operating mechanism.
Figure 6:
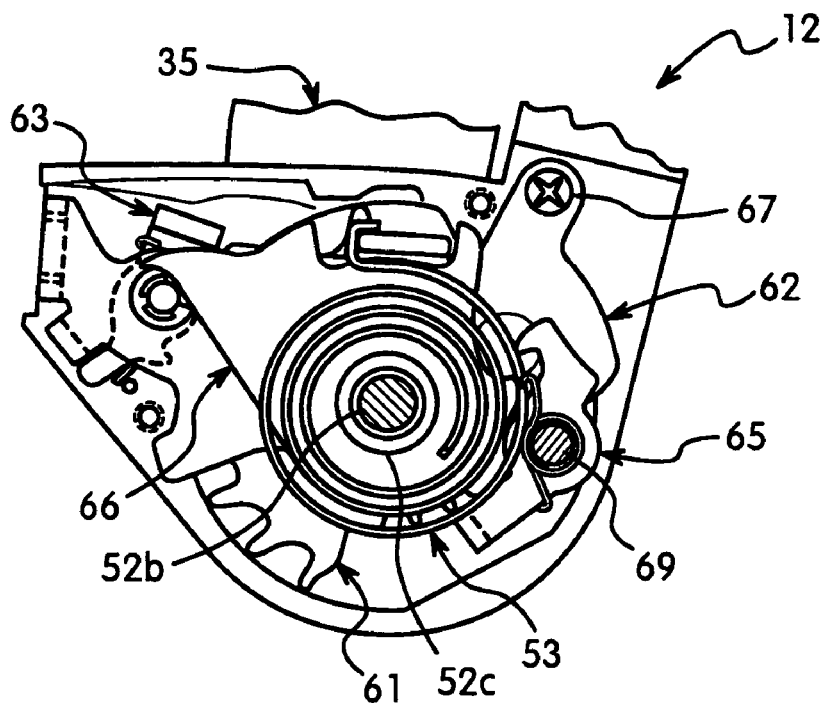
FIG. 6 is a partial bottom plan view of the rear shift operating device illustrated in FIGS. 3–5 with the selected parts removed to show the main biasing member, the release plate, the power switching element and the positioning pawl of the rear shift operating mechanism.

The rear shift operating device 12 basically includes a mounting assembly 31 (best seen in FIGS. 3 and 4), an operating mechanism 32 (best seen in FIG. 10), a shift wire take-up element 33 (best seen in FIGS. 9 and 19), a wire winding/release mechanism 34 (best seen in FIG. 7) and a gear indicator 35 (best seen in FIGS. 3 and 4). As best seen in FIG. 5, the operating mechanism 32, the shift wire take-up element 33, the wire winding/release mechanism 34 and the gear indicator 35 are coupled to the mounting assembly 31.

The mounting assembly 31 basically includes a housing portion 40, a clamping portion 41 and a shift cable adjusting unit 42. The particular structure of the mounting assembly 31 is not critical to the present invention, and thus, will not be discussed or illustrated in detail herein. Generally, the housing portion 40 is constructed of two covers or pieces 40a and 40b that enclose the operating mechanism 32, the shift wire take-up element 33 and the wire winding/release mechanism 34. The covers 40a and 40b are constructed of a rigid material such as a metal or rigid plastic. The lower cover 40b is preferably releasably coupled to the upper cover 40a in a conventional manner. For example, the covers 40a and 40b are fixedly coupled together by one or more screws (not shown) or other suitable fasteners.

The gear indicator 35 is fixedly coupled to the upper cover 40a and operatively coupled to the shift wire take-up element 33. Rotation of the shift wire take-up element 33 causes a pointer in the gear indicator 35 to move to indicate the current gear position. The structure of the gear indicator 35 is well known in the bicycle art. Thus, the gear indicator 35 will not be discussed or illustrated in detail herein.

The clamping portion 41 is also fixedly coupled to the upper cover 40a. Preferably, the clamping portion 41 is integrally formed as a one-unitary member with the upper cover 40a. The clamping portion 41 is preferably a split ring member forming an adjustable handlebar opening. A clamp bolt 41a is operatively coupled to the clamping portion 41 to adjust the handlebar opening of the clamping portion 41 in a conventional manner. Thus, the clamping portion 41 is adapted to receive a portion of the handlebar 16a therein. By tightening the bolt 41a, the clamping portion 41 is squeezed about the handlebar 16a to fixedly couple the rear shift operating device 12 to the handlebar 16a.

The shift cable adjusting unit 42 basically includes an adjusting bolt 42a and an adjusting nut 42b. The cable adjusting unit 42 is operatively coupled to the housing portion 40 by the wire winding/release mechanism 34 as discussed below. The shift cable adjusting unit 42 is arranged to adjust the effective length of the inner wire 23a in a conventional manner. In other words, the structure of the shift cable adjusting unit 42 is well known in the bicycle art. Thus, the shift cable adjusting unit 42 will not be discussed or illustrated in detail herein.

Figure 10:
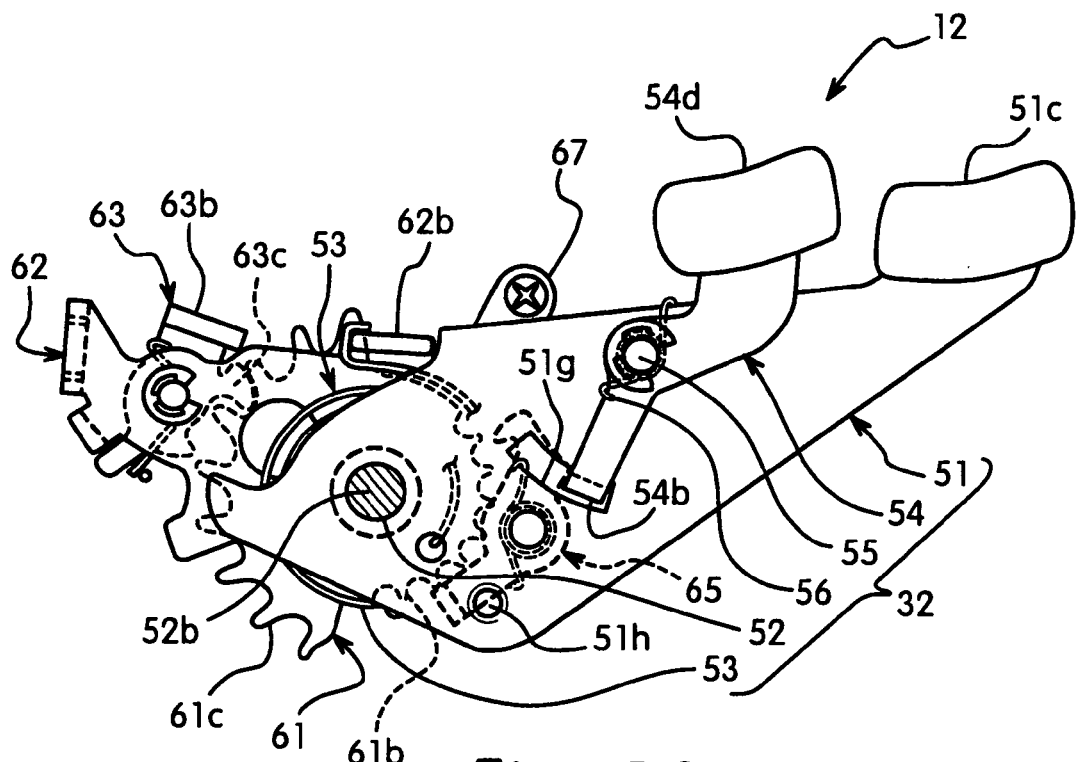
FIG. 10 is a partial bottom plan view of the rear shift operating device illustrated in FIGS. 3–9 with the first and second shift operating members in a rest position, and with selected portions removed or broken away for the purpose of illustration.
Figure 11:
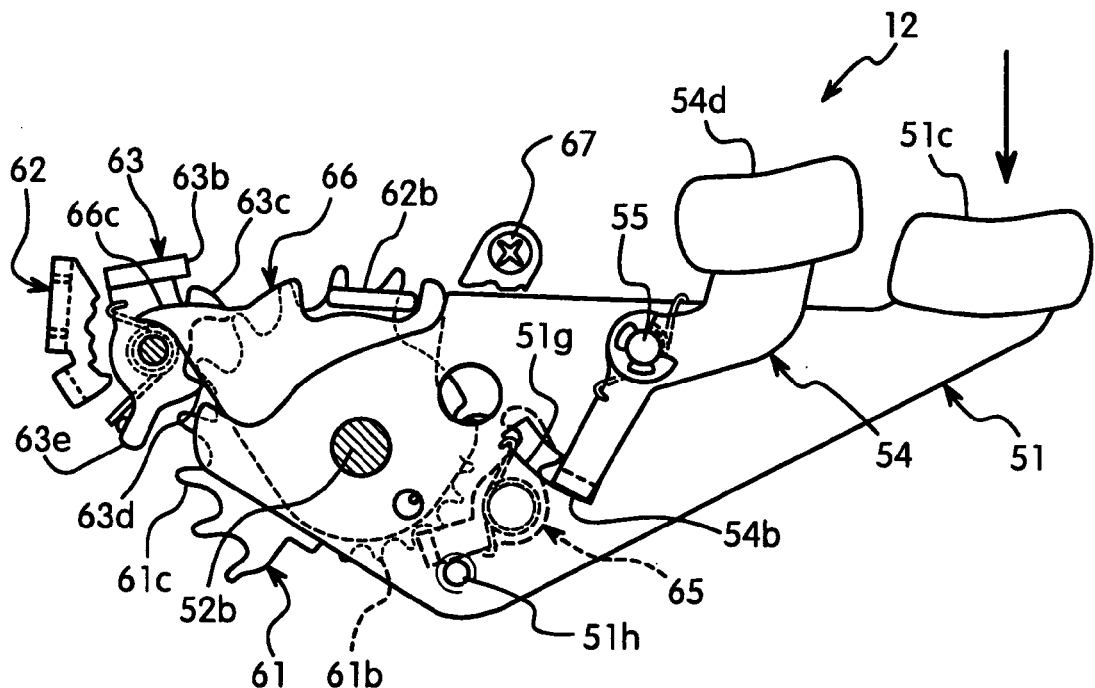
FIG. 11 is a partial bottom plan view of the rear shift operating device illustrated in FIGS. 3–10 with portions broken away or removed for the purposes of illustration, and with the first shift operating member moved or rotated to a shifting or wire operating position such that the first tooth of the positioning pawl has moved out of engagement with the winding ratchet member and the second tooth of the positioning pawl has moved into engagement with the winding ratchet member to shift one shift position from the rest position of FIG. 10.
Figure 12:
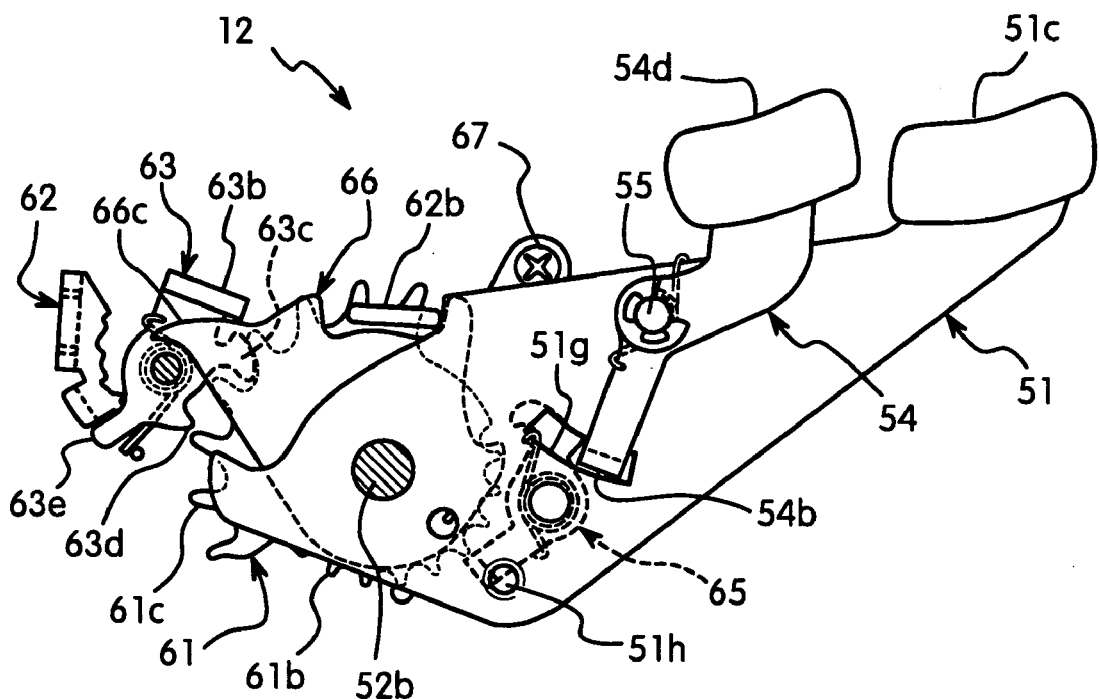
FIG. 12 is a partial bottom plan view of the rear shift operating device illustrated in FIGS. 3–11 with portions broken away or removed for the purposes of illustration, and with the first shift operating member moved or rotated back to the initial rest position, but after the winding ratchet member and the shift wire take-up element has moved one shift position from the rest position of FIG. 10.
Figure 13:
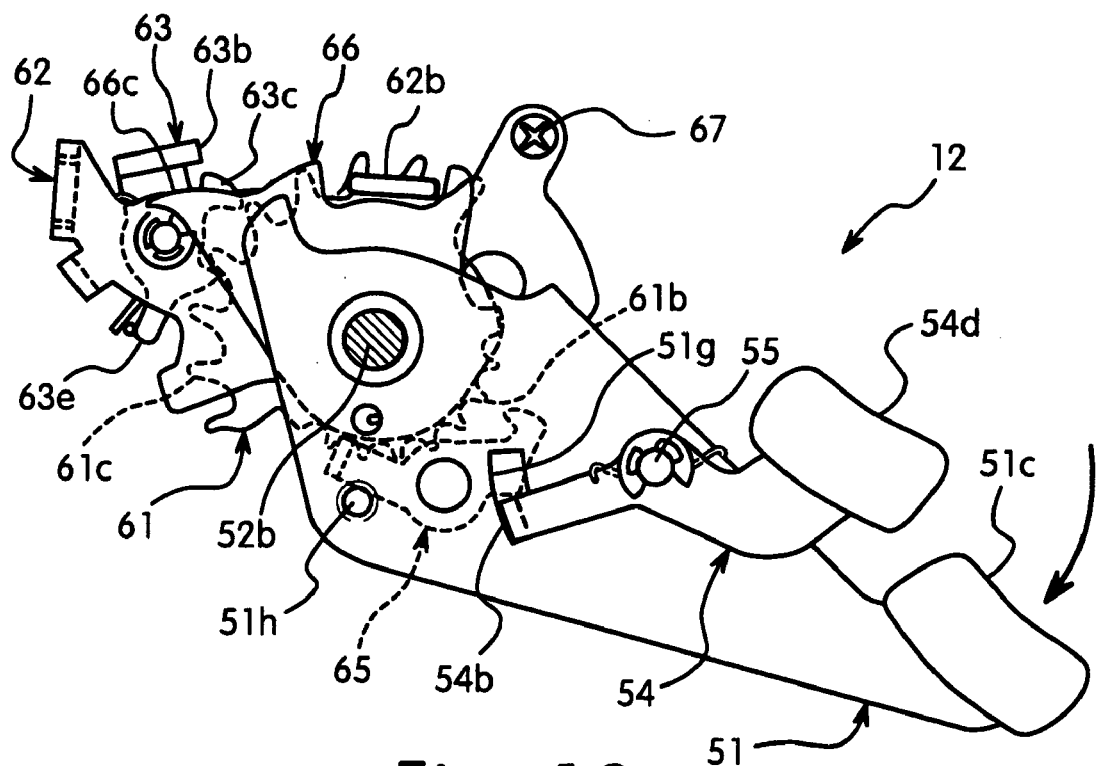
FIG. 13 is a partial bottom plan view of the rear shift operating device illustrated in FIGS. 3–11 with portions broken away or removed for the purposes of illustration, and with the first shift operating member moved or rotated to a shift position such that the first tooth of the positioning pawl has moved out of engagement with the winding ratchet member and the second tooth of the positioning pawl has moved into engagement with the winding ratchet member to shift two shift positions from the rest position of FIG. 10.
Figure 14:
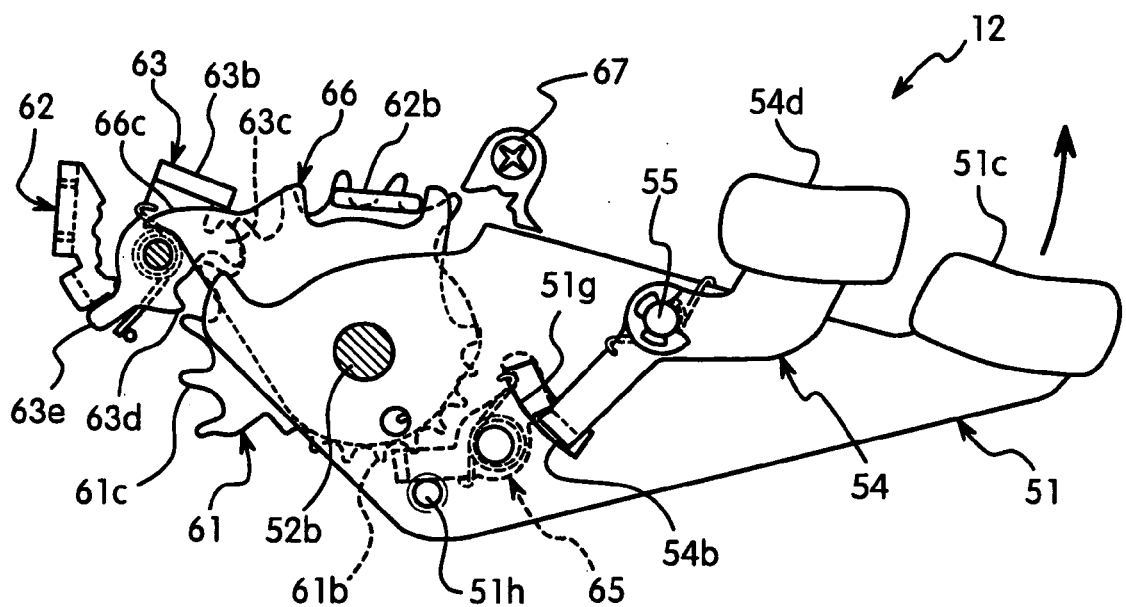
FIG. 14 is a partial bottom plan view of the rear shift operating device illustrated in FIGS. 3–13 with portions broken away or removed for the purposes of illustration, and with the first shift operating member in an intermediate position, i.e., moving or rotating back to the initial rest position, but after the winding ratchet member and the shift wire take-up element has moved two shift positions from the rest position of FIG. 10.
Figure 15:
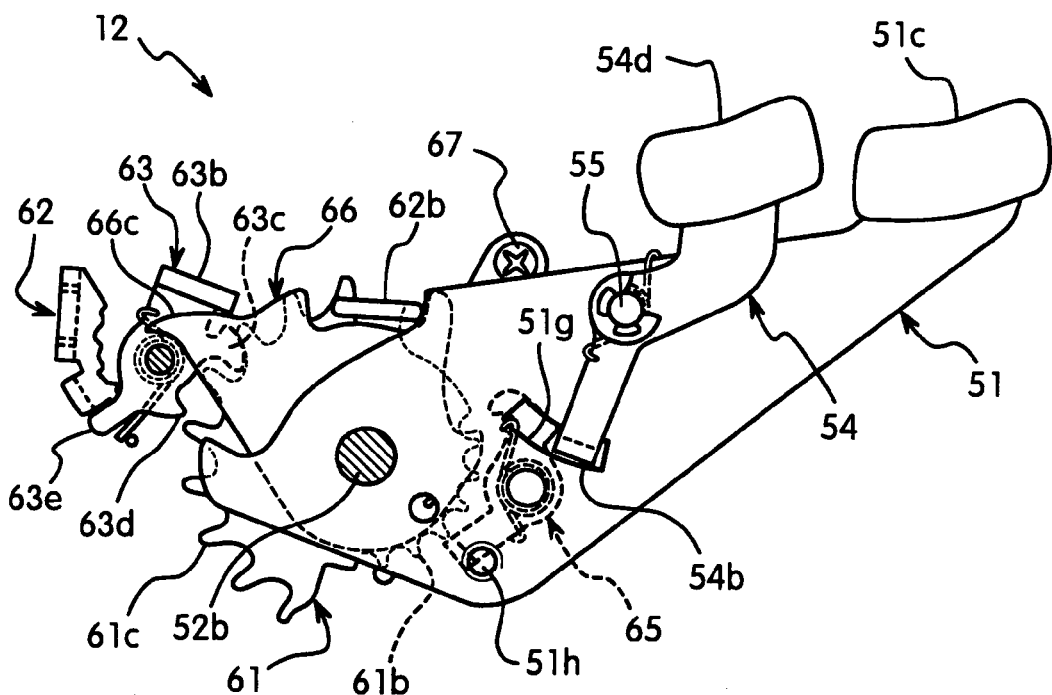
FIG. 15 is a partial bottom plan view of the rear shift operating device illustrated in FIGS. 3–14 with the first and second shift operating members in a rest position, and with selected portions removed or broken away for the purpose of illustration.
Figure 16:
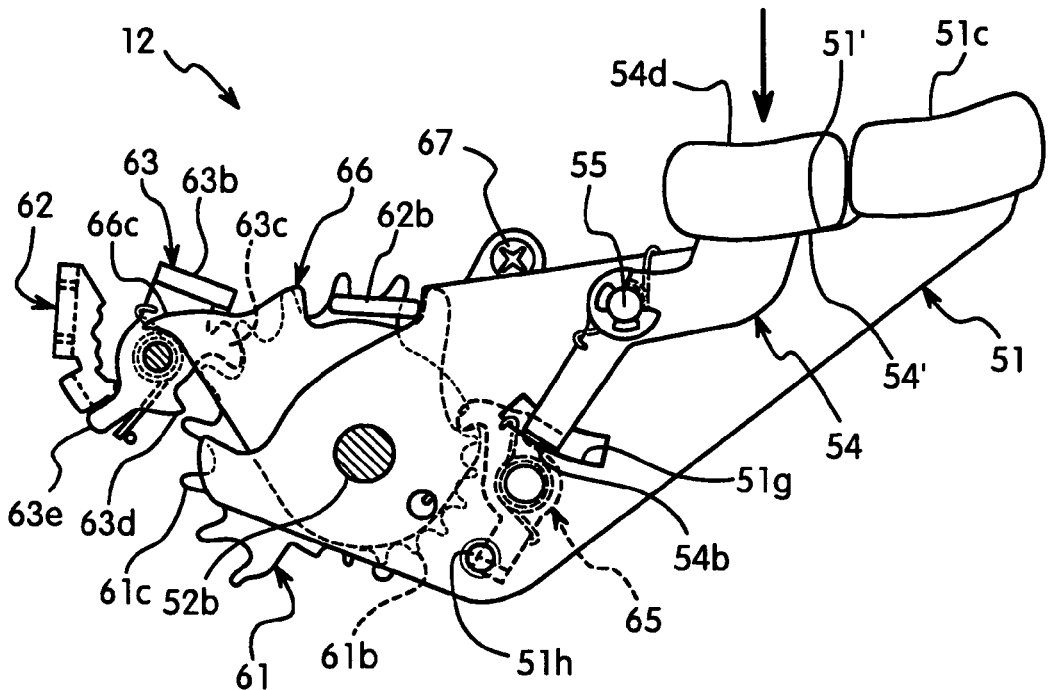
FIG. 16 is a partial bottom plan view of the rear shift operating device illustrated in FIGS. 3–15 with portions broken away or removed for the purposes of illustration, and with the second shift operating member moved or rotated to a shift position such that the winding pawl portion of the power switching element has moved out of engagement with the winding ratchet member and the release mechanism driving portion of the power switching element has moved into engagement with the release plate.

Turning now to FIGS. 5 and 10, the operating mechanism 32 basically includes a first operating (pulling) member 51 mounted on a main axle 52, a first biasing member 53, a second operating (releasing) member 54 pivotally mounted on a secondary axle 55, and a second biasing member 56. The operating mechanism 32 is designed to pull and release the inner wire 23a. More specifically, when a rider pushes the first operating member 51, the movement of the first operating member 51 rotates the shift wire take-up element 33 to pull a predetermined amount of the inner wire 23a into the housing portion 40. By pulling the inner wire 23a into the housing portion 40, the rear derailleur 18a is moved in a first lateral direction relative to the center plane of the bicycle frame 16. When a rider pushes the second operating member 54, the movement of the second operating member 54 rotates the shift wire take-up element 33 to release a predetermined amount of the inner wire 23a out of the housing portion 40. By releasing the inner wire 23a out of the housing portion 40, the rear derailleur 18a is moved in a second lateral direction, opposite to the first lateral direction, relative to the center plane of the bicycle frame 16.

The first operating member 51 pivotally coupled to the housing portion 40 by the main axle 52. The first biasing member 53 normally biases the first operating member 51 to the first rest position as shown in FIG. 10. When the first operating member 51 is pushed and released, the first operating member 51 pivots about a main pivot axis of the main axle 52 in a first operating direction between the first rest position as shown in FIG. 10 and a first wire operating position as shown in either FIG. 11 or FIG. 13. Accordingly, the rotation of the first operating member 51 about the main axle 52 causes the inner wire 23a to the pulled into the housing portion 40 and wound onto the shift wire take-up element 33. Thus, explained below, the first operating member 51 is operatively coupled to the wire winding/release mechanism 34 which is arranged to wind and release the shift wire take-up element 33 by predetermined amount that corresponds to a single gear shift upon movement of the first operating member 51 from the rest position to the wire operating position.

Figure 19:
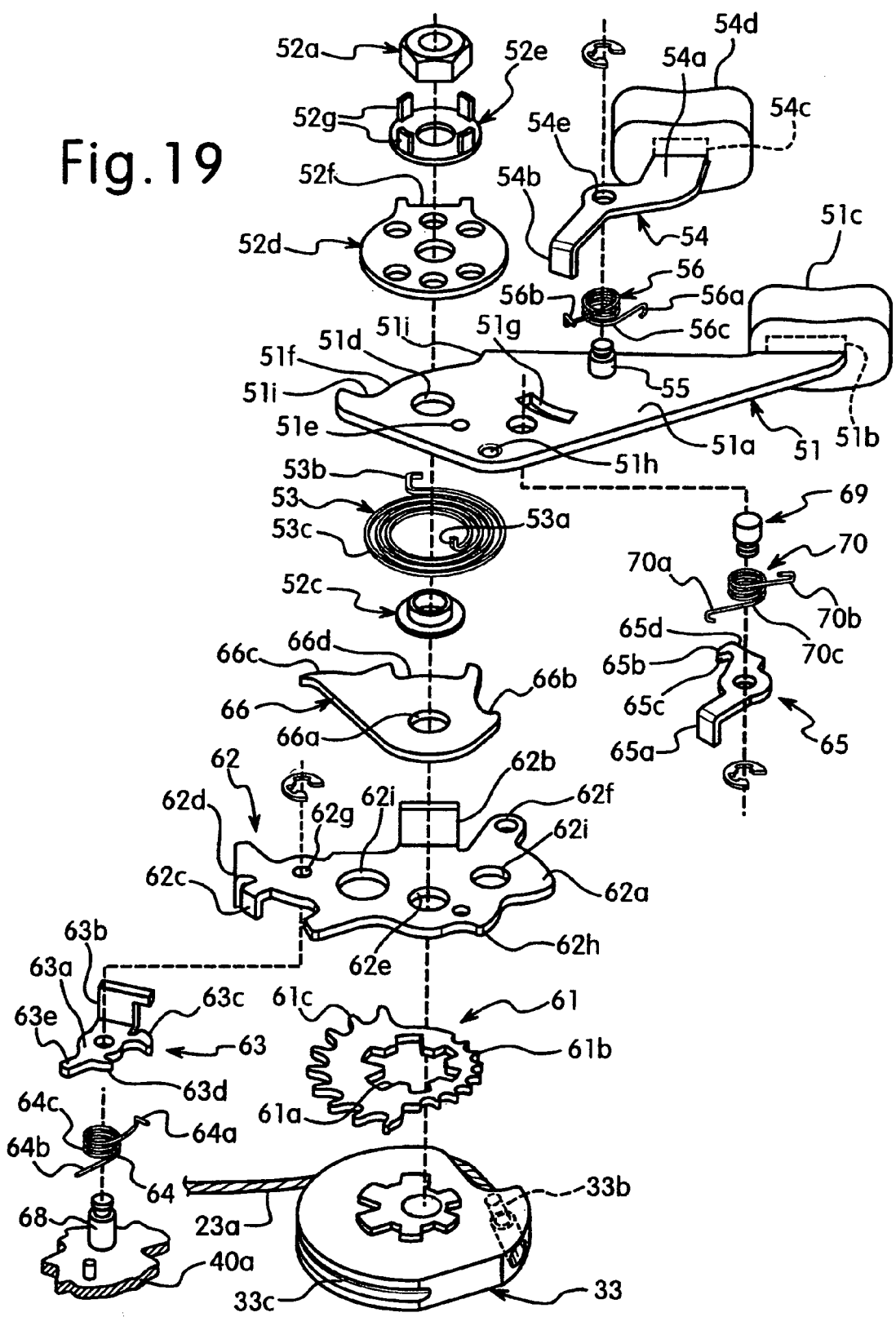
FIG. 19 is an exploded perspective view of selected parts of the rear shift operating device illustrated in FIGS. 3–18.
Figure 20:
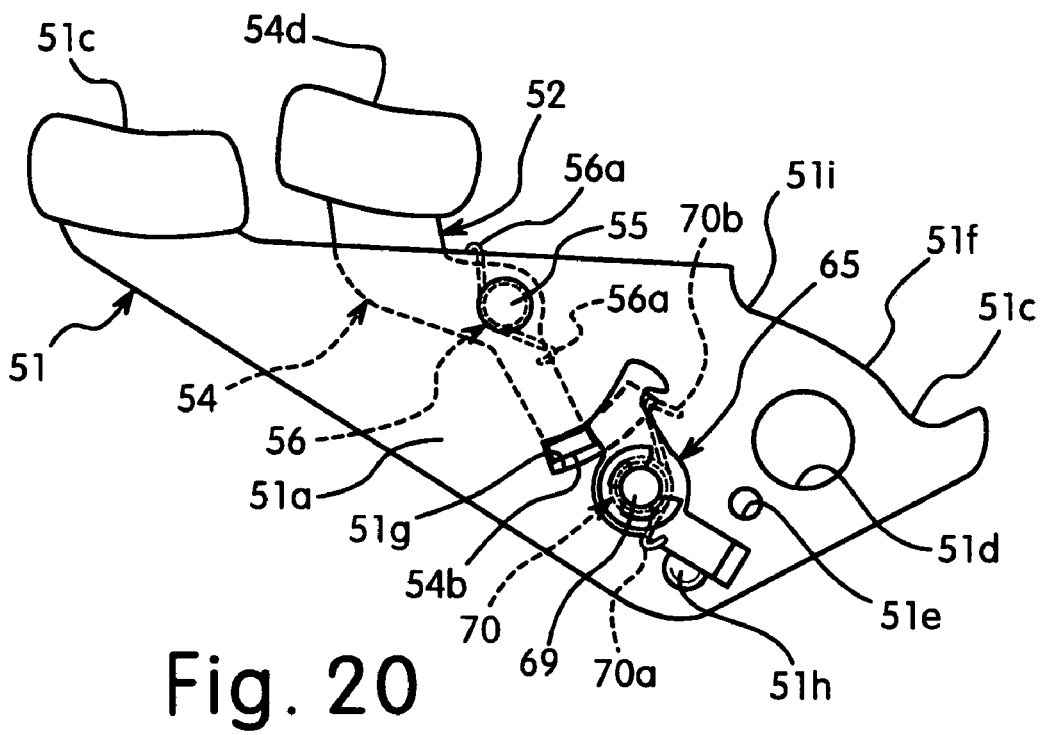
FIG. 20 is a top plan view of the first and second shift operating members and the power switching element of the rear shift operating device illustrated in FIGS. 3–19.
Figure 21:
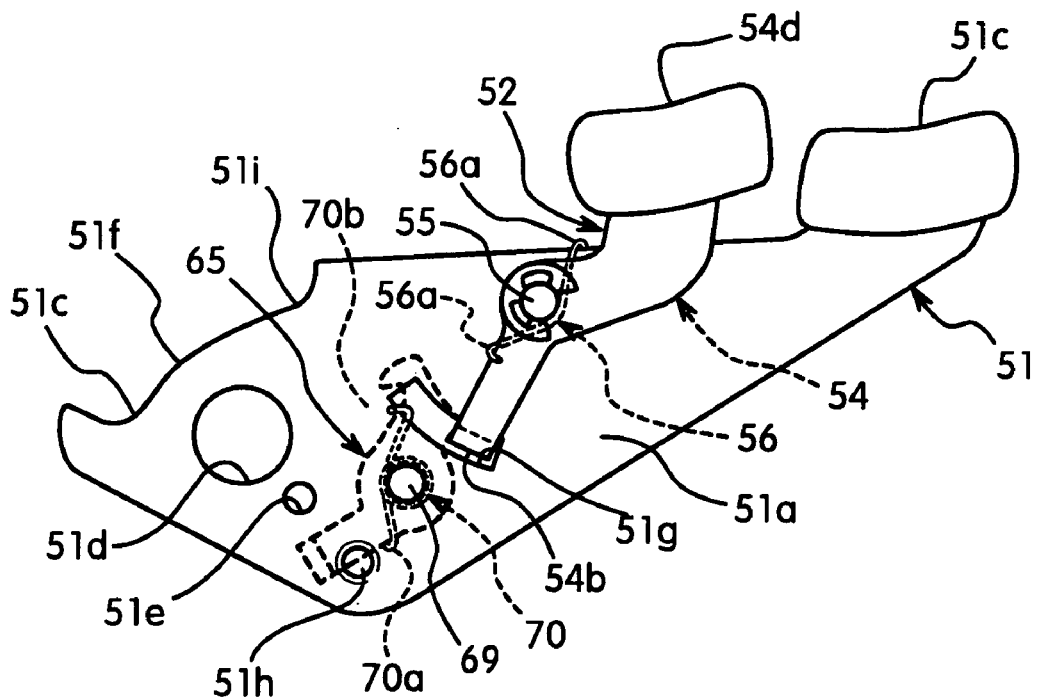
FIG. 21 is a bottom plan view of the first and second shift operating members and the power switching element of the rear shift operating device illustrated in FIGS. 3–19.
Figure 22:
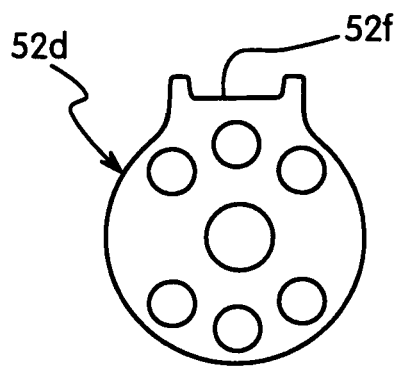
FIG. 22 is a bottom plan view of the washer for the rear shift operating device illustrated in FIGS. 3–19.
Figure 24:
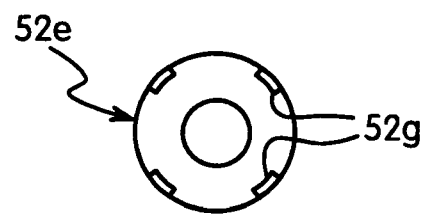
FIG. 24 is a bottom plan view of the locking clip for the rear shift operating device illustrated in FIGS. 3–19.
Figure 23:
FIG. 23 is a side elevational view of the washer illustrated in FIG. 22.
Figure 25:
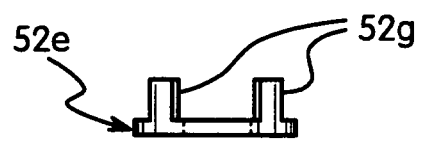
FIG. 25 is a side elevational view of the locking clip illustrated in FIG. 24.
Figure 26:
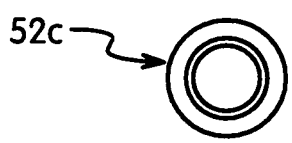
FIG. 26 is a bottom plan view of the bushing for the rear shift operating device illustrated in FIGS. 3–19.

Referring now to FIGS. 19, 20 and 21, the first operating member 51 basically includes a main lever portion 51a and an operating portion 51b that extends substantially perpendicular to the main lever portion 51a. The operating portion 51b has a cap element 51c that covers the operating portion 51b to form a button or engagement element that the rider can engage, for example, with a thumb or a finger. Preferably, the first operating member 51 is constructed of a rigid, hard material such as a metal plate, while the cap element 51c is created from a softer material such as a plastic or elastomeric material.

Referring now to FIGS. 20 and 21, the main lever portion 51a has a main pivot hole 51d, a spring mounting hole 51e, a cutout 51f, an arcuate control slot 51g and a winding pawl support 51h. The pivot hole 51d receives the main axle 52 therethrough such that the first operating member 51 pivots about the main pivot axis of the main axle 52. One end of the first biasing member 53 is located in the spring mounting hole 51e for biasing the first operating member 51 to the rest position. The cutout 51f is formed in the edge of the main lever portion 51a such as to form a pair of main lever end stops 51i that limit the pivotal movement of the first operating member 51 about the main axle 52. The arcuate control slot 51 is arranged for limiting the relative movement of the second operating lever 54 relative to the first operating member 51 as discussed below.

The winding pawl support 51h is formed by punching or deforming the main lever portion 51a. The winding pawl support 51h extending upwardly from the top side surface of the main lever portion 51a for supporting a part of the wire winding/release mechanism 34 as discussed below.

Referring now to FIGS. 5 and 19, the main axle 52 basically comprises a nut 52a, a bolt 52b, a bushing 52c, a washer 52d and a locking clip 52e. The bolt 52b and the nut 52a of the main axle 52 are coupled together in a conventional manner to secure the first operating member 51, the shift wire take-up element 33 and portions of the wire winding/release mechanism 34 to the housing portion 40. The bushing 52c contacts the main lever portion 51a of the first operating member 51 such that a space is provided for the first biasing member 53. In other words, the bushing 52c is sized such that when the nut 52a is tightened onto the bolt 52b, the compressive forces from the nut 52a and the bolt 52b do not squeezed the first biasing member 53.

The washer 52d has a cutout 52f that engages a part of the wire winding/release mechanism 34 such that the washer 52d does not rotate relative to the housing portion 40. The locking clip 52e has four tabs 52g that are bent to engage the sides of the nut 52a to prevent inadvertent unloosening the nut 52a relative to the bolt 52b.

Figure 28:
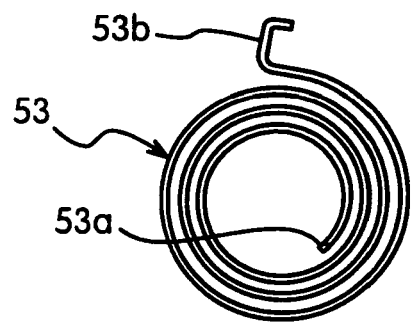
FIG. 28 is a bottom plan view of the first biasing member for the rear shift operating device illustrated in FIGS. 3–19.
Figure 27:
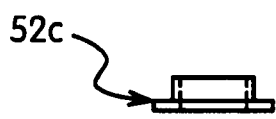
FIG. 27 is a side elevational view of the bushing illustrated in FIG. 26.
Figure 29:
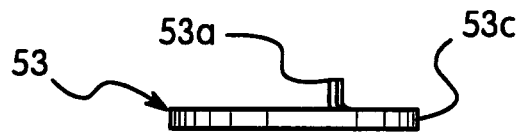
FIG. 29 is a side elevational view of the first biasing member illustrated in FIG. 28.
Figure 30:
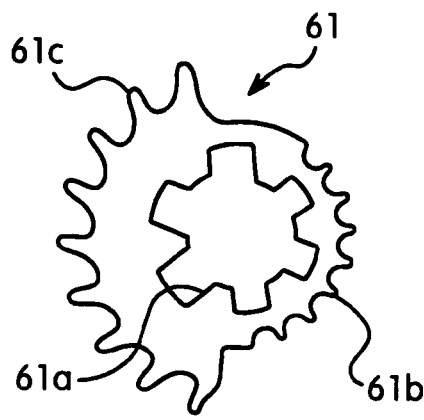
FIG. 30 is a bottom plan view of the winding ratchet member for the rear shift operating device illustrated in FIGS. 3–19.
Figure 32:
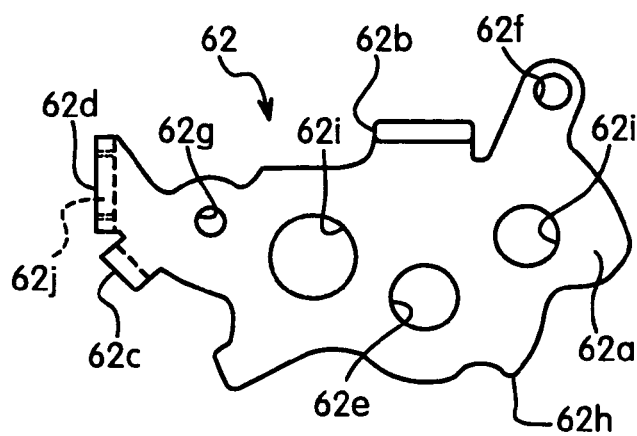
FIG. 32 is a bottom plan view of the intermediate plate of the rear shift operating device illustrated in FIGS. 3–19.
Figure 31:
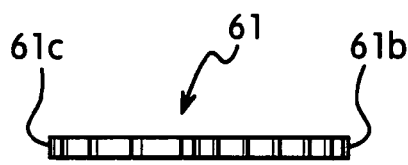
FIG. 31 is a side elevational view of the winding ratchet member illustrated in FIG. 30.
Figure 33:
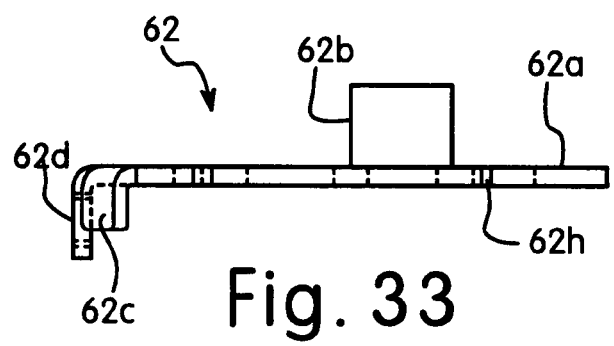
FIG. 33 is a side elevational view of the intermediate plate illustrated in FIG. 32.
Figure 34:
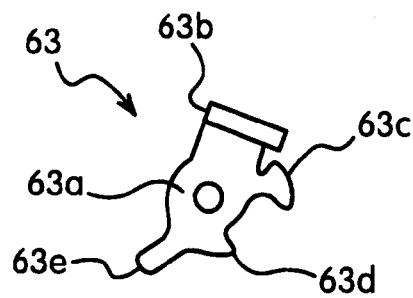
FIG. 34 is a bottom plan view of the positioning element or pawl for the rear shift operating device illustrated in FIGS. 3–19.
Figure 36:
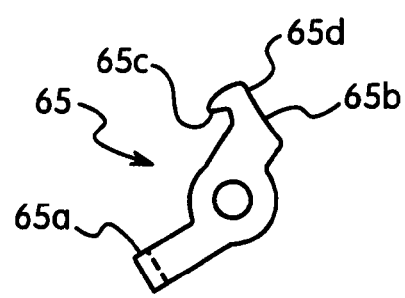
FIG. 36 is a bottom plan view of the power switching element for the rear shift operating device illustrated in FIGS. 3–19.
Figure 35:
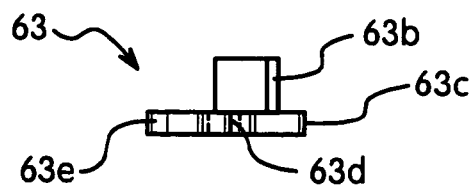
FIG. 35 is a side elevational view of the positioning element or pawl illustrated in FIG. 34.
Figure 37:
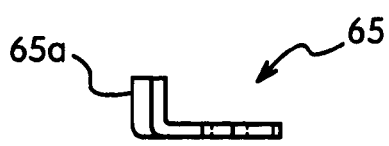
FIG. 37 is a side elevational view of the power switching element illustrated in FIG. 36.
Figure 38:
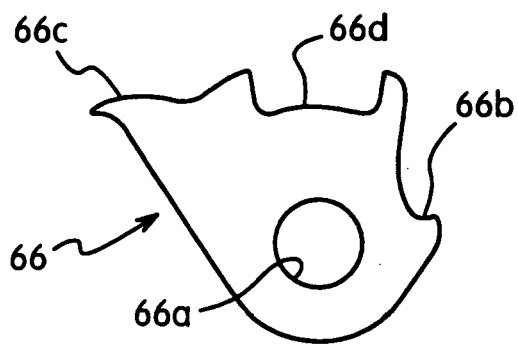
FIG. 38 is a bottom plan view of the release plate for the rear shift operating device illustrated in FIGS. 3–19.
Figure 39:
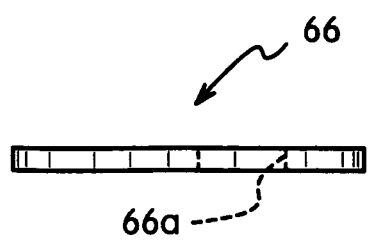
FIG. 39 is a side elevational view of the release plate illustrated in FIG. 38.

Referring now to FIGS. 28 and 29, the first biasing member 53 is preferably torsion spring that is operatively coupled between the first operating member 51 and a portion of the wire winding/release mechanism 34 that is fixed to the housing portion 40. The first biasing member 53 is preloaded such that the first operating member 51 is urged by the first biasing member 53 about the main axle 52 into contact with a stationary part of the wire winding/release mechanism 34 as discussed below. Accordingly, the first operating member 51 is urged by the first biasing member 53 about the main axle 52 from the wire operating position to the rest position. The first biasing member 53 has a first free end 53a, a second free end 53b and a coiled portion 53c. The first free end 53a is received in the spring mounting hole 51e of the main lever portion 51a. The first second free end 53b engages a part of the wire winding/release mechanism 34 as discussed below. The coiled portion 53c is mounted about the main axle 52. The first biasing member 53 is shown in an unloaded state in FIGS. 28 and 29.

Referring now to FIGS. 19, 20 and 21, the second operating member 54 is disposed on the first operating member 51 such that the first and second operating members 51 and 54 at least partially move together about the main axle 52, when the second operating member 54 moves between a rest position and a wire operating position. More specifically, the second operating member 54 is arranged to initially move relative to the first operating member 51, and then subsequently move together when the second operating member 54 as the second operating member moves from the rest position to the wire operating position. Upon release of the second operating member 54, the first and second operating members 51 and 54 are urged back to their rest positions by the first and second biasing members 53 and 56. More specifically, the first biasing member 53 urges the first and second operating members 51 and 54 to their rest positions relative to the housing portion 40, while the second biasing member 56 urges the second operating member 54 to its rest position relative to the first operating member 51. In other words, the second biasing member 56 is arranged to normally urge the second operating member 54 from the intermediate position to its rest position.

The second operating member 54 is pivotally mounted on the main lever portion 51a of the first operating member 51 by the secondary axle 55. The secondary axle 55 forms a secondary pivot axis that is parallel to the main pivot axis of the main axle 52. As mentioned above, the second operating member 54 is arranged to at least partially pivot about the first pivot axis of the main axle 52 and to at least partially pivot about the secondary pivot axis of the secondary axle 55. The secondary pivot axis of the secondary axle 55 is offset from the main pivot axis of the main axle 52 during the pivotal movement of the second operating member 54 from the rest position to the wire operating position. In other words, when the second operating member 54 is initially pushed against the urging force of the second biasing member 56, the second operating member 54 initially rotates relative to the first operating member 51. Then, further movement of the second operating member 54 causes the first and second operating members 51 and 54 can move together as a unit against the urging force of the first biasing member 53 about the main pivot axis of the main axle 52. When the second operating member 54 initially rotates relative to the first operating member 51, the second operating member 54 cooperates with the wire winding/release mechanism 34 such that the wire winding/release mechanism 34 is switched from a winding operation to a release operation. Accordingly, when the first and second operating members 51 and 54 move together and then return to the rest position, the wire winding/release mechanism 34 releases the shift wire take-up element 33 by predetermined amount that corresponds to a single gear shift upon movement of the second operating member 54 from the second rest position to the second wire operating position and back to the second rest position.

Preferably, the second operating member 54 is constructed from a hard rigid material such as metal. The second operating member 54 basically includes a main lever portion 54a, a first leg portion 54b and a second leg portion 54c. The first and second leg portions 54b and 54c extend substantially perpendicular to the main lever portion 54a in opposite directions. The first leg portion 54b extends through the arcuate control slot 51g of the main lever portion 51a of the first operating member 54, while the second leg portion 54c is located outside of the housing portion 40. The second leg portion 54c has a button or cap element 54d mounted on the second leg portion 54c so as to form a button or engagement member for the rider to press, for example, with a thumb or a finger. In other words, a rider pushes the cap element 54d to move the second operating member 54 from its rest position to its wire operating position. The main lever position 54a of the second operating member 54 has a pivot hole 54e that receives the secondary axle 55 therethrough such that the second operating member 54 is pivotally mounted on the first operating member 51.

Referring now to FIG. 19, the secondary axle 55 is preferably a pivot pin having a headed portion at one end and a groove with a c-clip at the other end. The headed portion of the secondary axle 55 contacts the main lever portion 51a of the first operating member 51 such that the second operating member 54 is pivotally mounted on the first operating member 51.

Still referring now to FIG. 19, the second biasing member 56 is preferably torsion spring having a pair of free ends 56a and 56b and a coiled portion 56c located on the secondary axle 55. The free end 56a of the second biasing member 56 engages the main lever portion 54a of the second operating member 54, while the second free end 56b of the second biasing member 56 contacts the main lever portion 51a of the first operating member 51. Thus, the first and second operating members 51 and 54 are arranged for limiting rotational movement relative to each other against the biasing force of the secondary biasing member 56.

Figure 9:
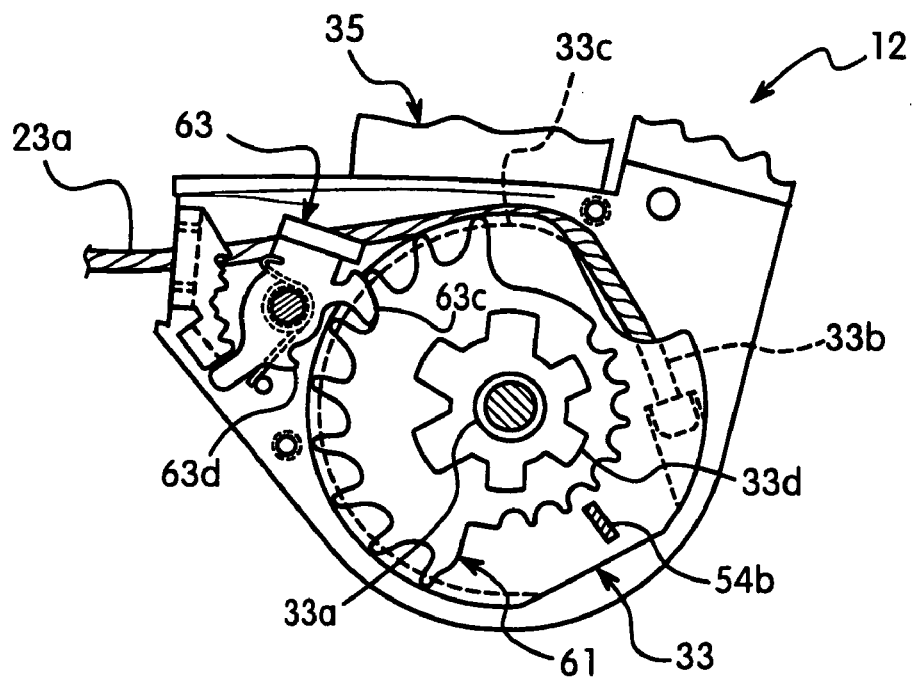
FIG. 9 is a partial bottom plan view of the rear shift operating device illustrated in FIGS. 3–8 with the selected parts removed to show the shift wire take-up element, the winding ratchet member and the positioning pawl of the rear shift operating mechanism.

Referring now to FIG. 9, the shift wire take-up element 33 is preferably a plastic element that is pivotally mounted on the main axle 52. The shift wire take-up element 33 is normally biased about the main axle 52 by the spring (not shown) of the rear derailleur 18a, which places the inner wire 23a under tension. The pivotal movement of the shift wire take-up element 33 is controlled by the wire winding/release mechanism 34, as discussed below. The shift wire take-up element 33 has a center pivot hole 33a for receiving a main axle 52 therethrough such that the shift wire take-up element 33 is pivotally mounted on the main axle 52. Basically, the shift wire take-up element 33 is a winding member in which the inner wire 23a is wound about the periphery of the shift wire take-up element 33. Thus, the inner wire 23a has one end fixedly coupled to the shift wire take-up element 33 and the other end adjustably coupled to the rear derailleur 18a in a conventional manner. In particular, the shift wire take-up element 33 has an inner wire receiving bore 33b that forms a cable attachment point such that the inner wire 23 is fixedly attached to the bore 33b of the shift wire take-up element 33. Preferably, an inner wire groove 33c is formed on the peripheral edge of the shift wire take-up element 33 for receiving the inner wire 23a as the shift wire take-up element 33 is rotated such that the inner wire 23a is wound about the peripheral edge of the shift wire take-up element 33. The bottom side surface of the shift wire take-up element 33 has a non-circular projecting portion 33d that defines a splined mounting shaft for a part of the wire winding/release mechanism 34 as discussed below. Thus, the shift wire take-up element 33 is fixed to the wire winding/release mechanism 34 such that the rotational movement of the shift wire take-up element 33 is controlled by the wire winding/release mechanism 34 as discussed below.

Figure 7:
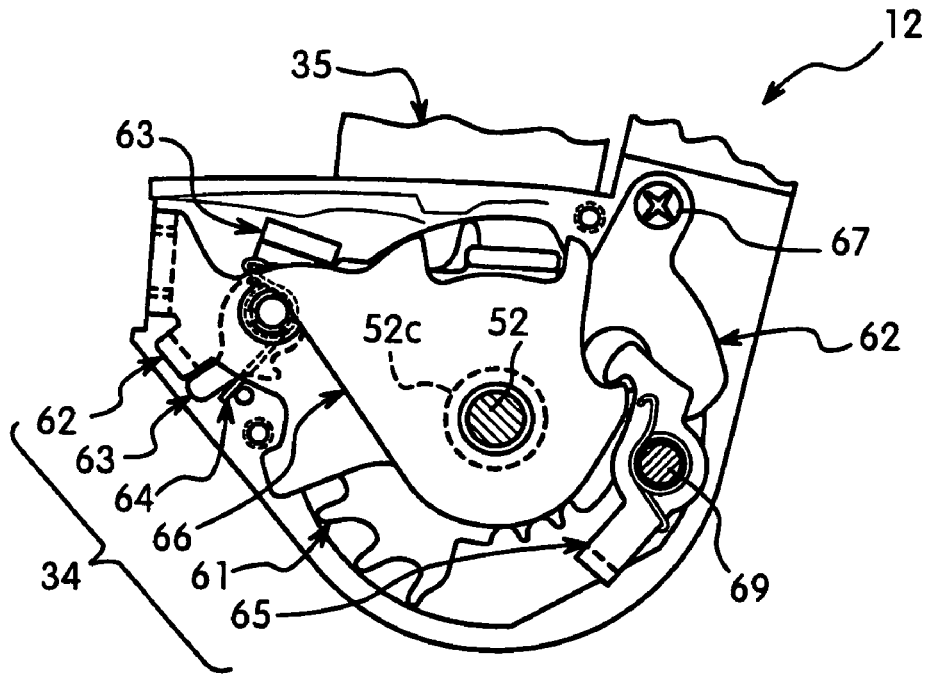
FIG. 7 is a partial bottom plan view of the rear shift operating device illustrated in FIGS. 3–6 with the selected parts removed to show the power switching element rotated to engage the release plate, of the rear shift operating mechanism.
Figure 8:
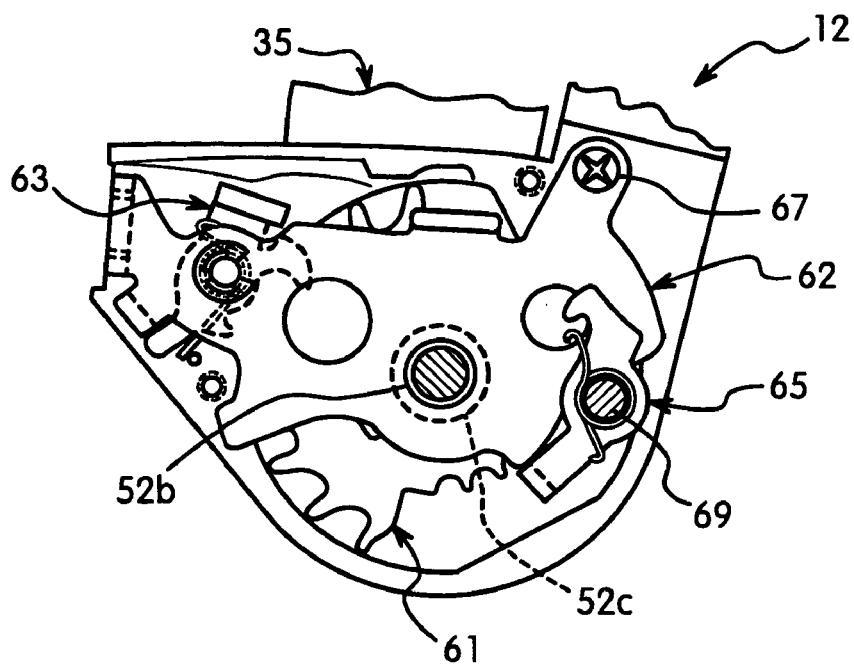
FIG. 8 is a partial bottom plan view of the rear shift operating device illustrated in FIGS. 3–7 with the selected parts removed to show the intermediate plate, the power switching element and the positioning pawl of the rear shift operating mechanism.

Referring now to FIG. 19, the wire winding/release mechanism 34 is arranged to wind the shift wire take-up element 33 by a predetermined amount that corresponds to a single gear shift upon movement of the first operating member 51 by a predetermined amount. Moreover, the wire winding/release mechanism 34 is arranged to release the shift wire take-up element 33 by a predetermined amount that corresponds to a single gear shift upon movement of the second operating member 54. However, the wire winding/release mechanism 34 can be rotated by the first operating member 51 such that the shift wire take-up element 33 is wound to correspond to a plurality of gear shifts. As best seen in FIG. 7, the wire winding/release mechanism 34 basically includes a winding ratchet member 61, an intermediate plate 62, a positioning element or pawl 63, a positioning pawl biasing element 64, a power switching element 65 and a release plate 66.

The winding ratchet member 61 is constructed of a hard rigid material such a metal. The winding ratchet member 61 is fixedly mounted to rotate with the shift wire take-up element 33. More specifically, the winding ratchet member 61 has a non-circular mounting hole 61a that corresponds to the non-circular projecting portion 33d of the shift wire take-up element 33. The shapes of the non-circular mounting hole 61a and the non-circular projecting portion 33d are configured such that the winding ratchet member 61 can only be mounted in one orientation on the shift wire take-up element 33. Thus, the shift wire take-up element 33 and the winding ratchet member 61 rotate together about the main axle 52 in response to the movements of the first and second operating members 51 and 54.

The winding ratchet member 61 has a plurality of first winding teeth 61b located along a portion of its peripheral edge and a plurality of second positioning teeth 61c located along a second portion of its peripheral edge. The winding teeth 61b are arranged to selectively engage the power switching element 65, as discussed below such that movement of the first operating member 51 from its rest position to its wire operating position causes the winding ratchet member 61 and the shift wire take-up element 33 to rotate in a first operating direction to wind the inner wire 23a about the periphery of the shift wire take-up element 33. The second positioning teeth 61c are arranged to selectively be engaged by the positioning pawl 63 to control the movement of the shift wire take-up element 33 upon operation of the first and second operating members 51 and 54. In other words, the positioning pawl 63 selectively engages the second positioning teeth 61c of the winding ratchet member 61 to hold the shift wire take-up element 33 in one of the shift positions after the shift wire take-up element 33 has been advanced one shift position by the first operating member 51 and the first operating member 51 has been released from its wire operating position. Moreover, upon movement of the second operating member 54, the positioning pawl 63 selectively engages the second positioning teeth 61c of the winding ratchet member 61 to allow the shift wire take-up element 33 to rotate one of the shift positions upon release of the second operating member 54 from its wire operating position.

The intermediate plate 62 is fixed to the upper cover 40a of the housing portion 40 such the intermediate plate 62 does not move relative to the housing portion 40. The intermediate plate 62 is preferably a hard rigid member that is preferably constructed of a metal material. The intermediate plate 62 is a control plate that provides stop surfaces to limit the movements of the first operating member 51, the positioning pawl 63 and the release plate 66 relative to the housing portion 40. The intermediate plate 62 also acts as a mounting plate for attaching the shift cable adjusting unit 42 to the housing portion 40. Moreover, the intermediate plate 62 acts as a support plate for pivotally mounting the positioning pawl 63 to the housing portion 40 as discussed below.

The intermediate plate 62 is preferably fixedly secured to the upper cover 40a of the housing portion 40 by a screw 67. The intermediate plate 62 basically has a plate or body section 62a, a first stop or control flange 62b, a second stop or control flange 62c and an adjusting unit mounting flange 62d. The intermediate plate 62 is preferably located between the winding ratchet member 61 and the release plate 66 on the main pivot axle 52. The intermediate plate 62 preferably supports the positioning pawl 63 as discussed below.

Preferably, the body section 62a of the intermediate plate 62 has a main pivot hole 62e, a mounting hole 62f, a position pawl mounting hole 62g, a rest surface 62h and a pair of weight reducing holes 62i. The main pivot hole 62e receives the shaft portion of the bolt 52b of the main axle 52 therethrough. The mounting hole 62f receives the screw 67 therethrough for fixing the intermediate plate 62 to the housing portion 40.

The control flange 62b extends perpendicular to the body section 62a. The control flange 62b has the second free end 53b of the first biasing member 53 fixedly coupled thereto such that the first operating member 51 is bias to its rest position relative to the intermediate plate 62 which is fixed to the housing portion 40. The control flange 62b engages the washer 52d of the main axle 52 such that the orientation of the washer 52d is fixed, i.e., the washer 52d does not rotate on the bolt 52b of the main axle 52. The control flange 62b also provides stop surfaces to limit the movements of the first operating member 51, the positioning pawl 63 and the release plate 66 relative to the housing portion 40 as discussed below. Regarding first operating member 51, the control flange 62b is located in the cutout 51f of the main lever portion 51a of the first operating member 51 to limit the pivot movement of the first operating member 51 relative to the housing portion 40.

The control flange 62c preferably extends substantially perpendicular to the body section 62a in the opposite direction from the control flange 62b. The control flange 62c is arranged to limit the pivotal movement of the positioning pawl 63 such that the positioning pawl 63 is normal urged against the control flange 62c by the positioning pawl biasing element 64 as discussed below.

Referring back to FIGS. 3–5, the mounting flange 62d is provided with a threaded hole 62j for adjustably coupling the shift cable adjusting unit 42 thereto. In particular, the bolt 42a is threaded into the threaded hole 62j of the mounting flange 62d to hold the shift cable adjusting unit 42 in the correct position relative to the housing portion 40.

Referring now to FIGS. 6–9, the positioning pawl 63 is rotatably attached to the intermediate plate 62 on a pivot pin 68 formed on the upper cover 40a (see FIG. 19), and urged by the positioning pawl biasing element 64 to operatively engage the second positioning teeth 61c of the winding ratchet member 61. Thus, the positioning pawl 63 is arranged to selectively engage the second positioning teeth 61c of the winding ratchet member 61 to hold the shift wire take-up element 33 in one of the shift positions. In other words, the positioning pawl 63 selectively engages the second positioning teeth 61c of the winding ratchet member 61 to hold the shift wire take-up element 33 in one of the shift positions after the shift wire take-up element 33 has been advanced one shift position by the first operating member 51 and the first operating member 51 has been released from its wire operating position. Moreover, upon movement of the second operating member 54, the positioning pawl 63 is rotated against the urging force of the positioning pawl biasing element 64 such that the positioning pawl 63 selectively engages the second positioning teeth 61c of the winding ratchet member 61 to allow the shift wire take-up element 33 to rotate one of the shift positions upon release of the second operating member 54 from its wire operating position.

The positioning pawl 63 has a plate or body portion 63a and a control portion or flange 63b that extends substantially perpendicular to the plate portion 63a. The plate portion 63a includes a first tooth 63c, a second tooth 63d and a stop flange 63e. The first tooth 63c and the second tooth 63d selectively contact the second positioning teeth 61c of the winding ratchet member 61 to control the movement of the winding ratchet member 61 by the first and second operating members 51 and 54. More specifically, the positioning pawl 63 is normally biased by the positioning pawl biasing element 64 such that the first tooth 63c is normally in contact with one of the teeth of the second positioning teeth 61c such that the winding ratchet member 61 and the shift wire take-up element 33 are normally held in one of the shift positions.

The first tooth 63c and the second positioning teeth 61c are configured such that a one-way ratcheting mechanism if formed between the positioning pawl 63 and the winding ratchet member 61. Thus, when the winding ratchet member 61 is rotated in the first operating direction by the first operating member 51, the second positioning teeth 61c pivots the positioning pawl 63 against the urging force of the positioning pawl biasing element 64 such that the first tooth 63c ratchets along the second positioning teeth 61c to allow rotation of the winding ratchet member 61 and the shift wire take-up element 33 for winding or pulling the inner wire 23a. Once, the winding ratchet member 61 and the shift wire take-up element 33 have rotated one shift position, the first tooth 63c of the positioning pawl 63 engages the second positioning teeth 61c to prevent the winding ratchet member 61 and the shift wire take-up element 33 from rotation in a wire release direction.

The second tooth 63d of the positioning pawl 63 is arranged relative to the first tooth 63c of the positioning pawl 63 and the second positioning teeth 61c so as to control the release operation of the winding ratchet member 61. More specifically, when the second operating member 54 is moved from its rest position to its wire operating (releasing) position, the first tooth 63c of the positioning pawl 63 is moved out of engagement from the second positioning teeth 61c by the release plate 66, and the second tooth 63d of the positioning pawl 63 moves into engagement with the second positioning teeth 61c such that the winding ratchet member 61 can only move a limited amount the second operating (releasing) direction. When the second operating member 54 is released, the first tooth 63c of the positioning pawl 63 reengages the second positioning teeth 61c to prevent further rotational movement of the winding ratchet member 61 and the shift wire take-up element 33 in the second operating (releasing) direction.

The stop flange 63e is arranged to contact the stop or control flange 62c of the intermediate plate 62 to limit the amount of movement of the positioning pawl 63. In other words, the positioning pawl biasing element 64 normally biases the positioning pawl 63 about the pivot pin 68 such that the stop flange 63e rest against the stop flange 62c of the intermediate plate 62 and the first tooth 63c of the positioning pawl 63 is engaged with the second positioning teeth 61c.

The positioning pawl biasing element 64 is preferably torsion spring. The positioning pawl biasing element 64 preferably has a pair of free ends 64a and 64b and a coiled portion 64c positioned around the pivot pin 68. The free end 64a contacts the plate or body portion 63a of the positioning pawl 63, while the second free end 64b contacts an abutment formed on the upper cover 40a of the housing portion 40.

The power switching element 65 is a hard rigid plate member that is selectively arranged on the first operating member 51 to selectively engage the winding ratchet member 61 and the positioning pawl 63. The power switching element 65 is operatively coupled to the first operating member 51 to rotate the shift wire take-up element 33 to perform a winding operation upon movement of the first operating member 51 from its rest position to its wire operating position. The power switching element 65 is also operatively coupled to the second operating member 54 to move the positioning pawl 63 to release the shift wire take-up element 33 to perform a release operation upon movement of the second operating member 54 from its rest position to its wire operating (releasing) position. Specifically, the power switching element 65 is arranged to be moved by the second operating member 54, when the second operating member 54 moves independently of the first operating member 51, i.e., prior to the first operating member 51 moving with the second operating member 54. In other words, when the second operating member 54 moves the power switching element 65 the release operation is performed.

The power switching element 65 basically includes a winding pawl portion 65a and a release mechanism driving portion 65b. The winding pawl portion 65a is arranged to selectively engage the first winding teeth 61b of the winding ratchet member 61 to perform the winding operation upon pivotal movement of the first operating member 51 from its rest position to the wire operating (pulling) position. The release mechanism driving portion 65b is arranged to selectively engage the release plate 66 such that the release plate 66 is moved to disengage the first tooth 63c of the positioning pawl 63 from the second positioning teeth 61c of the winding ratchet member 61 to perform the release operation upon pivotal movement of the second operating member 54 from its rest position to the wire operating (releasing) position. In other words, the release mechanism driving portion 65b is operatively coupled to the positioning element to release the shift wire take-up element 33 to perform the release operation upon movement of the second operating member 54 from its rest position to its wire operating position.

The power switching element 65 is preferably mounted on the main lever portion 51a by a pivot pin 69 to pivot between a winding position and a release position. The pivot pin 69 is received in a pivot hole of the power switching element 65 such that the power switching element 65 pivots on the first operating member 51. More specifically, the power switching element 65 is arranged such that the initial movement of the second operating member 54 to its intermediate position causes the second operating member 54 to contact the power switching element 65. This contact between the second operating member 54 and the power switching element 65 results in the power switching element 65 being pivoted about the axis of the pivot pin 69 such that the winding pawl portion 65a is moved out of engagement from the first winding teeth 61b of the winding ratchet member 61 and the release mechanism driving portion 65b moves into engagement with the release plate 66.

Figure 17:
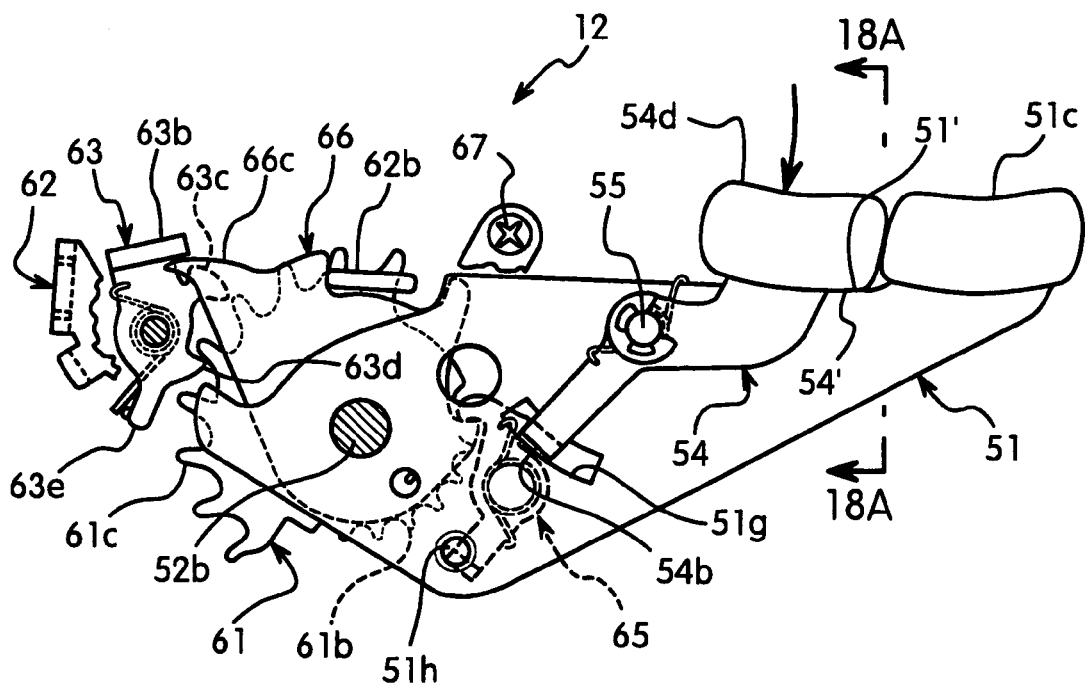
FIG. 17 is a partial bottom plan view of the rear shift operating device illustrated in FIGS. 3–16 with portions broken away or removed for the purposes of illustration, and with the first and second shift operating members moved or rotated together such that the release plate is rotated to move the first tooth of the positioning pawl out of engagement with the winding ratchet member and the second tooth of the positioning pawl into engagement with the winding ratchet member to shift one shift position from the rest position of FIG. 15
Figure 18:
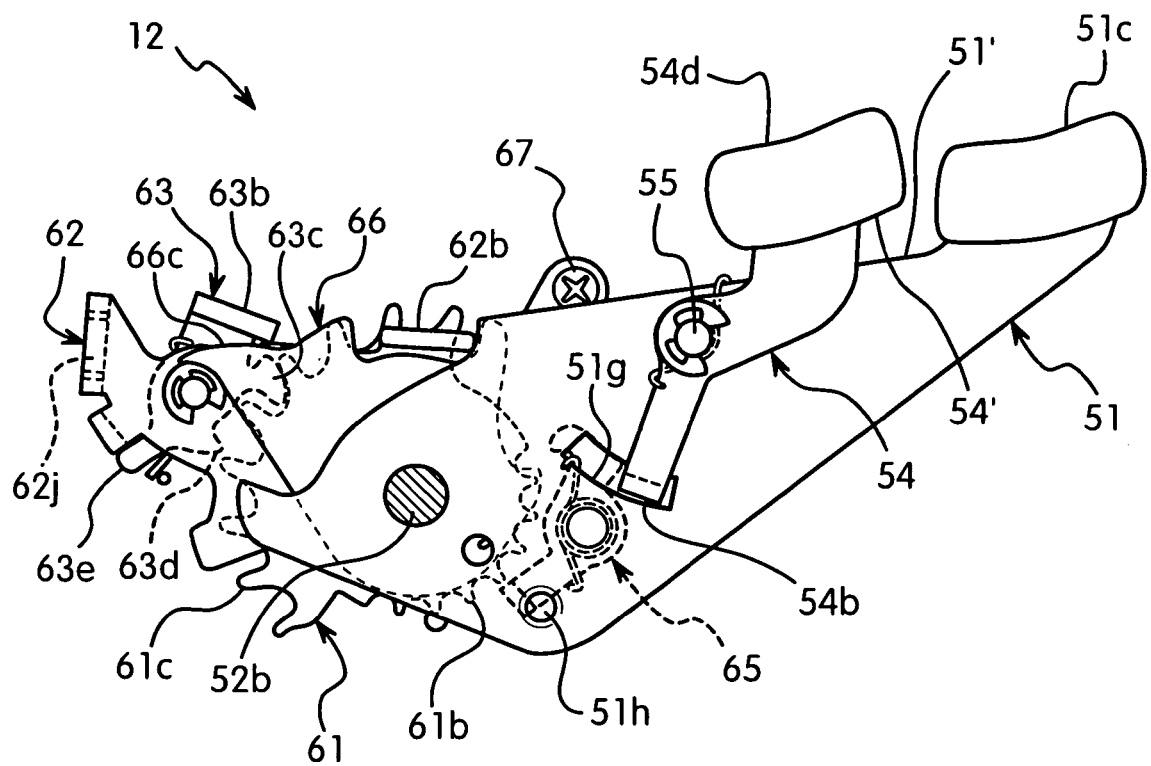
FIG. 18 is a partial bottom plan view of the rear shift operating device illustrated in FIGS. 3–17 with portions broken away or removed for the purposes of illustration, and with the first and second shift operating members moved or rotated back to the initial rest position, but after the winding ratchet member and the shift wire take-up element has moved one shift position from the rest position of FIG. 15.
Figure 18A:
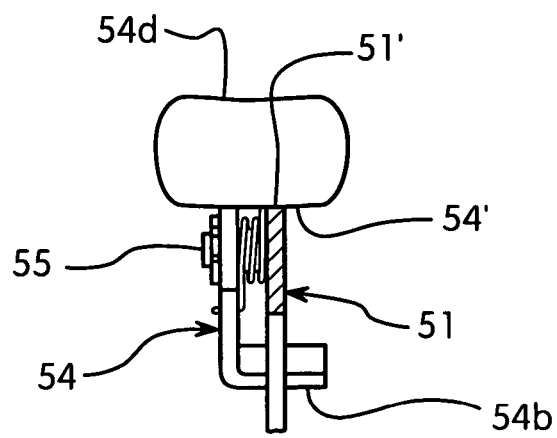
FIG. 18A is a partial cross sectional view of the first and second shift operating members as seen along section line 18A—18A of FIG. 17.

A winding pawl biasing element 70 urges the power switching element 65 such that the winding power portion 65a is normally biased towards the first winding teeth 61b of the winding ratchet member 61. However, when the first operating member 51 is in its rest position, the winding power portion 65a contacts a rest surface 62h of the intermediate plate 62 such that the winding power portion 65a is out of engagement with the first winding teeth 61b of the winding ratchet member 61. Thus, the release mechanism driving portion 65b is normally spaced from the release plate 66. However, when the power switching element 65 is rotated by the second operating member 54, the power switching element 65 rotates against the urging or biasing force of the winding pawl biasing element 70 such that the release mechanism driving portion 65b engages the release plate 66. Thus, further pivotal movement of the second operating member 54 from its intermediate position causes the first operating member 51 and the release plate 66 to rotate with the second operating member 54. In particular, as indicated in FIGS. 17 and 19, the button or cap element 54d forms a driving portion 54' of the second operating member 54 that abuts or contacts an edge of the main lever portion 51a that forms a driven portion 51' of the first operating member 51 such that further pivotal movement of the second operating member 54 from its intermediate position causes the first operating member 51 to rotate with the second operating member 54. This further pivotal movement of the second operating member 54 from its intermediate position also causes the release plate 66 to rotate such that the positioning pawl engagement portion 66c of the release plate 66 engages the control portion or flange 63b of the positioning pawl 63. This engagement between the release plate 66 and the positioning pawl 63 causes the positioning pawl 63 to rotate about its pivot pin 68 such that the first tooth 63c of the positional pawl 63 is moved out engagement from the second positioning teeth 61c, while the second tooth 63d is moved into engagement with the second positioning teeth 61c.

The winding pawl biasing element 70 is preferably torsion spring that is operatively coupled between the first operating member 51 and a portion of the power switching element 65. The winding pawl biasing element 70 has a first free end 70a, a second free end 70b and a coiled portion 70c. The first free end 70a engages a part of the power switching element 65. The second free end 70b engages a part of the first operating member 51. The coiled portion 70c is mounted about the pivot pin 69.

The release mechanism driving portion 65b includes a release surface 65c for engaging the release plate 66 to rotate the release plate 66. This rotation of release plate 66 cause the positional pawl 63 to move out engagement from the second positioning teeth 61c such that the winding ratchet member 61 is released. The release mechanism driving portion 65b also includes an engagement surface 65d that is engaged by the first leg portion 54b of the second operating member 54 when the second operating member 54 is pushed from the rest position to an intermediate position, i.e., prior to the first and second operating members 51 and 54 rotating together about the main axle 52.

The release plate 66 is operatively coupled to the release mechanism driving portion 65b of the power switching element 65 and the positioning pawl 63. Preferably, the release plate 66 is constructed of a hard rigid material such as a metal material. The release plate 66 basically has a center pivot hole 66a that receives the main axle 52, a winding pawl engagement portion 66b, a positioning pawl engagement portion 66c and a cutout 66d for limiting rotational movement of the release plate 66.

The rotational movement of the release plate 66 is limited to pivot within a predetermined range by the control flange 62b of the intermediate plate 62 that is located in the cutout 66d of the release plate 66. The winding pawl engagement portion 66b is configured and arranged to be selectively contacted by the release mechanism driving portion 65b of the power switching element 65. The positioning pawl engagement surface 66c is arranged to selectively engage the control portion 63b of the positioning pawl 63. In other words, when the second operating member 54 is initially rotated to the intermediate position, the second operating member 54 pivots the power switching element 65 about the pivot pin 69 such that the winding pawl portion 65a is disengaged from the first winding teeth 61b of the winding ratchet member 61. Also, this pivotal movement of the power switching element 65 causes the release mechanism driving portion 65b to contact the winding part engagement portion 66b of the release plate 66. This contact between the release plate 66 and the power switching element 65 causes the release plate 66 to rotate about the main axle 52 such that the positioning pawl engagement portion 66c contacts the control portion 63b of the positioning pawl 63. This contact between the positional pawl 63 and the release plate 66 causes the positioning pawl 63 to rotate about the pivot pin 68 such that the first tooth 63c is disengaged from second positioning tooth 61c and the second tooth 63d is moved into engagement with the second positioning tooth 61c. Further rotational movement of the second operating member 54 causes the first operating member 51 to rotate together with the second operating member 54 as the second operating member 54 move from the intermediate position to the second wire operating position. In particular, as indicated in FIGS. 17 and 19, the driving portion 54' of the second operating member 54 abuts or contacts the driven portion 51' of the first operating member 51 such that further pivotal movement of the second operating member 54 from its intermediate position causes the first operating member 51 to rotate with the second operating member 54.

This further pivotal movement of the second operating member 54 from its intermediate position also causes the release plate 66 to rotate such that the positioning pawl engagement portion 66c of the release plate 66 engages the control portion 63b of the positioning pawl 63. This engagement between the release plate 66 and the positioning pawl 63 causes the positioning pawl 63 to rotate about its pivot pin 68 such that the first tooth 63c of the positional pawl 63 is moved out engagement from the second positioning teeth 61c, while the second tooth 63d is moved into engagement with the second positioning teeth 61c. Thus, this movement of the first operating member 51 by the second operating member 54 causes the power switching element 65 to move the release plate 66 together with the first and second operating members 51 and 54.

Second Embodiment

Figure 40:
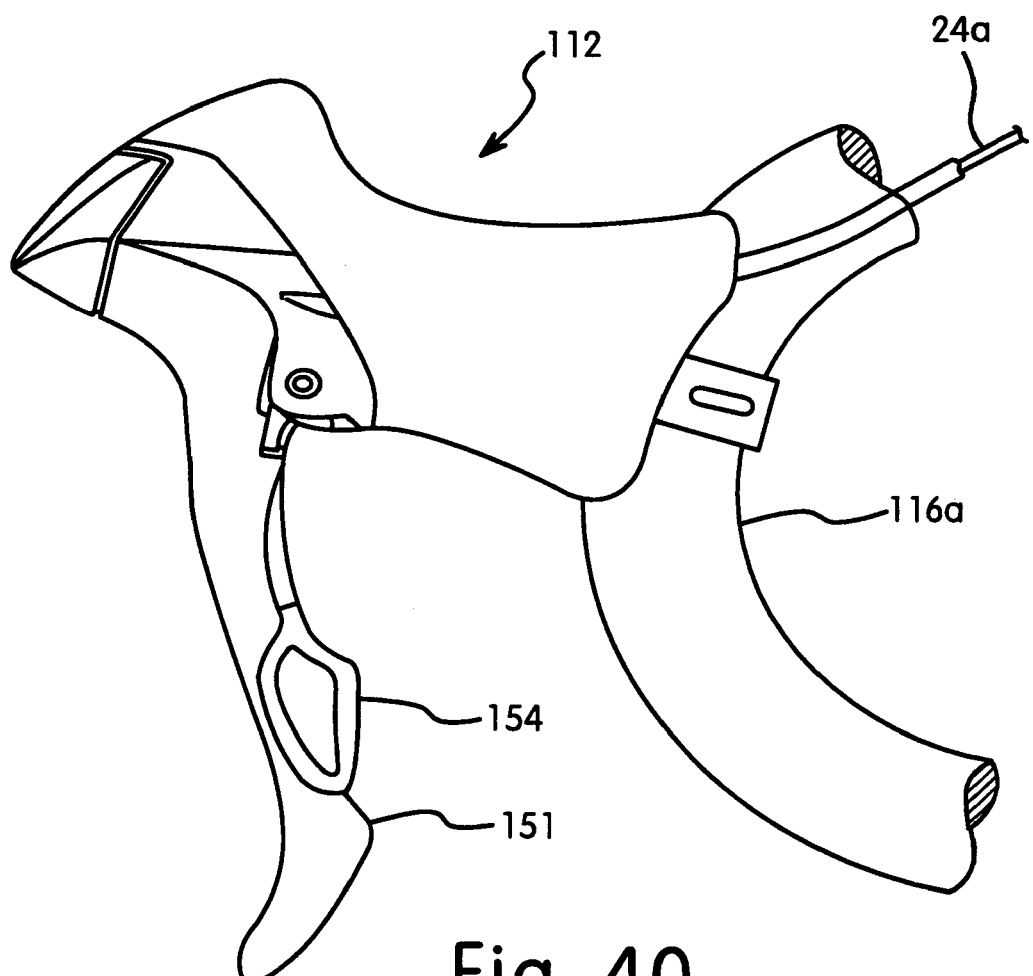
FIG. 40 is a side elevational view of a shift operating device in accordance with a second embodiment of the present invention.

Referring now to FIG. 40, a front or left shift operating device 112 in accordance with a second embodiment will now be explained. Basically, the shift operating device 112 is identical to the shift operating device 12, except that the present invention has been adapted to a drop type of a handlebar 116a and the winding ratchet member has fewer teeth. In other words, the internal mechanism of the shift operating device 112 is identical to the shift operating device 12, except that the present invention has been adapted to the drop type handlebar 116a and fewer teeth are used in the winding ratchet member. In view of the similarity between the first and second embodiments, the descriptions of the parts of this second embodiment have been omitted for the sake of brevity.

The operating mechanism of this embodiment basically includes a first operating (pulling lever) member 151 mounted on a main axle and a second operating (releasing lever) member 154 pivotally mounted on a secondary axle 55. The shift operating (shifting) levers or members 151 and 154 are moved in substantially the same rotational direction as in the first embodiment. The operating mechanism 32 is designed to pull and release the inner wire 24a to operate the front derailleur 18b shown in FIG. 1. More specifically, when a rider pushes the first operating member 151, the movement of the first operating member 151 rotates the shift wire take-up element to pull a predetermined amount of the inner wire 24a. By pulling the inner wire 24a, the front derailleur 18b is moved in a first lateral direction relative to the center plane of the bicycle frame 16. When a rider pushes the second operating member 154, the movement of the second operating member 154 rotates the shift wire take-up element to release a predetermined amount of the inner wire 24a. By releasing the inner wire 24a, the front derailleur 18b is moved in a second lateral direction, opposite to the first lateral direction, relative to the center plane of the bicycle frame 16.

In this embodiment, the first operating (pulling) member 151 is also a brake lever as disclosed in U.S. Pat. No. 5,241,878. The first operating (pulling) member 151 is pivotally coupled to the housing 140 in the same manner as the brake lever as disclosed in U.S. Pat. No. 5,241,878.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift operating device comprising:
    a first operating member arranged to move between a first rest position and a first wire operating position;
    a second operating member arranged to move between a second rest position and a second wire operating position;
    a shift wire take-up element arranged to rotate in a first rotational direction upon the movement of the first operating member from the first rest position to the first wire operating position, and arranged to rotate in a second rotational direction that is opposite to the first rotational direction upon the movement of the second operating member from the second rest position to the second wire operating position; and
    a wire winding/release mechanism operatively coupled to the shift wire take-up element and the first and second operating members to selectively hold the shift wire take-up element in one of a plurality of shift positions, the wire winding/release mechanism including a power switching element operatively coupling the shift wire take-up element to the first operating member to wind the shift wire take-up element upon movement of the first operating member from the first rest position to the first wire operating position, and the power switching element operatively coupling the shift wire take-up element to the second operating member to release the shift wire take-up element upon movement of the second operating member from the second rest position to the second wire operating position,
    the power switching element including a first portion that engages with the shift wire take-up element to rotate the shift wire take-up element in the first rotational direction in response to movement of the first operating member from the first rest position to the first wire operating position, and a second portion arranged to release the shift wire take-up element to allow limited rotation of the shift wire take-up element in the second rotational direction in response to movement of the second operating member from the second rest position to the second wire operating position, the first and second portions of the power switching element being non-movable relative to each other, and;
    the second portion of the power switching element being operatively disengaged from the shift wire take-up element to avoid contacting and controlling movement of the shift wire take-up element when the first and second operating members are in the first and second rest positions, respectively, and being operatively engaged with the shift wire take-up element when the second operating member is moved to the second wire operating position.

2. The bicycle shift operating device according to claim 1, wherein
    the first operating member is arranged to move about a main pivot axis of the shift wire take-up element in the first rotational direction upon the movement of the first operating member from the first rest position to the first wire operating position, and
    the second operating member is arranged to move about the main pivot axis of the shift wire take-up element in the first rotational direction upon the movement of the second operating member from the second rest position to the second wire operating position.

3. The bicycle shift operating device according to claim 1, wherein
the second operating member is disposed on the first operating member.

4. The bicycle shift operating device according to claim 3, wherein
the second operating member is movably mounted on the first operating member to at least partially move independently of the first operating member.

5. The bicycle shift operating device according to claim 1, wherein
the second operating member is arranged to at least partially move independently of the first operating member.

6. The bicycle shift operating device according to claim 1, wherein
the second operating member is arranged to abut the first operating member during the movement of the second operating member from the second rest position to the second wire operating position to move the first operating member with the second operating member.

7. The bicycle shift operating device according to claim 6, wherein
the second operating member is further arranged to at least partially move independently of the first operating member prior to the first operating member moving with the second operating member.

8. The bicycle shift operating device according to claim 7, wherein
the second operating member and the power switching element are further arranged to move the power switching element to perform a release operation when the second operating member moves independently of the first operating member prior to the first operating member moving with the second operating member.

9. The bicycle shift operating device according to claim 1, wherein
the shift wire take-up element and the first operating member are mounted on a main pivot axis, and the second operating member is arranged to at least partially pivot about the main pivot axis during the movement of the second operating member from the second rest position to the second wire operating position.

10. The bicycle shift operating device according to claim 1, wherein
the wire winding/release mechanism further includes a ratchet member mounted to rotate with the shift wire take-up element, and a positioning element arranged to selectively engage the ratchet member to hold the shift wire take-up element in one of the shift positions, with the power switching element being arranged to selectively engage the ratchet member and the positioning element, the power switching element being operatively coupled to the first operating member to rotate the shift wire take-up element to perform a winding operation upon movement of the first operating member from the first rest position to the first wire operating position, and the power switching element being operatively coupled to the second operating member to move the positioning element to release the shift wire take-up element to perform a release operation upon movement of the second operating member from the second rest position to the second wire operating position.

11. The bicycle shift operating device according to claim 10, wherein
the first portion of the power switching element being arranged to engage the ratchet member to perform the winding operation upon movement of the first operating member from the first rest position to the first wire operating position,
the second portion of the power switching element being operatively coupled to the positioning element to release the shift wire take-up element to perform the release operation upon movement of the second operating member from the second rest position to the second wire operating position.

12. The bicycle shift operating device according to claim 11, wherein
the wire winding/release mechanism further comprising a release plate being operatively coupled to the release mechanism driving portion of the power switching element and the positioning element.

13. The bicycle shift operating device according to claim 1, wherein
the wire winding/release mechanism is arranged to wind the shift wire take-up element by a predetermined amount that corresponds to a single gear shift upon movement of the first operating member from the first rest position to the first wire operating position, and
the wire winding/release mechanism is further arranged to release the shift wire take-up element by the predetermined amount that corresponds to the single gear shift upon movement of the second operating member from the second rest position to the second wire operating position and back to the second rest position.

14. The bicycle shift operating device according to claim 1, wherein
the power switching element is moved from the winding position to the release position by the second operating member during movement of the second operating member from the second rest position to the second wire operating position.

* * * * *